United States Patent
Lopatenko et al.

(10) Patent No.: US 9,009,146 B1
(45) Date of Patent: Apr. 14, 2015

(54) RANKING SEARCH RESULTS BASED ON SIMILAR QUERIES

(75) Inventors: Andrei Lopatenko, Cupertino, CA (US); Hyung-Jin Kim, Sunnyvale, CA (US); Sandor Dornbush, Mountain View, CA (US); Leonard Wei, Sunnyvale, CA (US); Timothy P. Kilbourn, Mountain View, CA (US); Mikhail Lopyrev, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/476,875

(22) Filed: May 21, 2012

Related U.S. Application Data

(63) Continuation of application No. 12/756,749, filed on Apr. 8, 2010, now abandoned.

(60) Provisional application No. 61/313,356, filed on Mar. 12, 2010, provisional application No. 61/167,698, filed on Apr. 8, 2009.

(51) Int. Cl.
*G06F 17/30* (2006.01)
*H04L 29/06* (2006.01)

(52) U.S. Cl.
CPC ................... *H04L 29/06* (2013.01)

(58) Field of Classification Search
USPC .................................. 707/723, 748
See application file for complete search history.

(56) References Cited

U.S. PATENT DOCUMENTS

| | | |
|---|---|---|
| 5,265,065 A | 11/1993 | Turtle |
| 5,488,725 A | 1/1996 | Turtle |
| 5,696,962 A | 12/1997 | Kupiec |
| 5,920,854 A | 7/1999 | Kirsch et al. |
| 5,963,940 A | 10/1999 | Liddy et al. |
| 6,006,222 A | 12/1999 | Culliss |

(Continued)

FOREIGN PATENT DOCUMENTS

| | | |
|---|---|---|
| WO | WO 00/77689 | 12/2000 |
| WO | WO 01/16807 | 3/2001 |

(Continued)

OTHER PUBLICATIONS

Baeza-Yates, Ricardo, Carlos Hurtado, and Marcelo Mendoza. "Query recommendation using query logs in search engines." Current Trends in Database Technology-EDBT 2004 Workshops. Springer Berlin Heidelberg, 2005.*

(Continued)

*Primary Examiner* — Usmaan Saeed
*Assistant Examiner* — Nah Hutton
(74) *Attorney, Agent, or Firm* — Fish & Richardson P.C.

(57) ABSTRACT

In general, in one aspect, embodiments of the invention feature a computer-implemented method for providing input to a document ranking process for ranking a plurality of documents, the document ranking process taking as input a quality of result statistic for an individual document in the plurality of documents, the plurality of documents having been identified in response to a query, the quality of results statistic being for the query and the individual document. The method for providing input can include, for a first document identified as a search result of a user-submitted query, scoring one or more other queries based upon a similarity to the user-submitted query, each of the one or more other queries being different from the user-submitted query.

20 Claims, 11 Drawing Sheets

(56) References Cited

U.S. PATENT DOCUMENTS

| | | |
|---|---|---|
| 6,006,225 A | 12/1999 | Bowman et al. |
| 6,014,665 A | 1/2000 | Culliss |
| 6,026,388 A | 2/2000 | Liddy et al. |
| 6,067,565 A | 5/2000 | Horvitz |
| 6,078,916 A | 6/2000 | Culliss |
| 6,078,917 A | 6/2000 | Paulsen et al. |
| 6,088,692 A | 7/2000 | Driscoll |
| 6,134,532 A | 10/2000 | Lazarus et al. |
| 6,182,066 B1 | 1/2001 | Marques et al. |
| 6,182,068 B1 | 1/2001 | Culliss |
| 6,185,559 B1 | 2/2001 | Brin et al. |
| 6,249,252 B1 | 6/2001 | Dupray |
| 6,269,368 B1 | 7/2001 | Diamond |
| 6,285,999 B1 | 9/2001 | Page |
| 6,321,228 B1 | 11/2001 | Crandall et al. |
| 6,327,590 B1 | 12/2001 | Chidlovskii et al. |
| 6,341,283 B1 | 1/2002 | Yamakawa et al. |
| 6,353,849 B1 | 3/2002 | Linsk |
| 6,363,378 B1 | 3/2002 | Conklin et al. |
| 6,370,526 B1 | 4/2002 | Agrawal et al. |
| 6,421,675 B1 | 7/2002 | Ryan et al. |
| 6,473,752 B1 | 10/2002 | Fleming, III |
| 6,480,843 B2 | 11/2002 | Li |
| 6,490,575 B1 | 12/2002 | Berstis |
| 6,526,440 B1 | 2/2003 | Bharat |
| 6,529,903 B2 | 3/2003 | Smith et al. |
| 6,539,377 B1 | 3/2003 | Culliss |
| 6,560,590 B1 | 5/2003 | Shwe et al. |
| 6,567,103 B1 | 5/2003 | Chaudhry |
| 6,587,848 B1 | 7/2003 | Aggarwal et al. |
| 6,615,209 B1 | 9/2003 | Gomes |
| 6,623,529 B1 | 9/2003 | Lakritz |
| 6,640,218 B1 | 10/2003 | Golding et al. |
| 6,658,423 B1 | 12/2003 | Pugh et al. |
| 6,671,681 B1 | 12/2003 | Emens et al. |
| 6,678,681 B1 | 1/2004 | Brin et al. |
| 6,701,309 B1 | 3/2004 | Beeferman et al. |
| 6,725,259 B1 | 4/2004 | Bharat |
| 6,738,764 B2 | 5/2004 | Mao et al. |
| 6,754,873 B1 | 6/2004 | Law et al. |
| 6,792,416 B2 | 9/2004 | Soetarman et al. |
| 6,795,820 B2 | 9/2004 | Barnett |
| 6,816,850 B2 | 11/2004 | Culliss |
| 6,853,993 B2 | 2/2005 | Ortega et al. |
| 6,873,982 B1 | 3/2005 | Bates et al. |
| 6,877,002 B2 | 4/2005 | Prince |
| 6,882,999 B2 | 4/2005 | Cohen et al. |
| 6,901,402 B1 | 5/2005 | Corston-Oliver et al. |
| 6,912,505 B2 | 6/2005 | Linden et al. |
| 6,944,611 B2 | 9/2005 | Flank et al. |
| 6,944,612 B2 | 9/2005 | Roustant et al. |
| 6,954,750 B2 | 10/2005 | Bradford |
| 6,963,867 B2 | 11/2005 | Ford et al. |
| 6,990,453 B2 | 1/2006 | Wang et al. |
| 7,016,939 B1 | 3/2006 | Rothwell et al. |
| 7,028,027 B1 | 4/2006 | Zha et al. |
| 7,072,886 B2 | 7/2006 | Salmenkaita et al. |
| 7,085,761 B2 | 8/2006 | Shibata |
| 7,113,939 B2 | 9/2006 | Chou et al. |
| 7,117,206 B1 | 10/2006 | Bharat et al. |
| 7,136,849 B2 | 11/2006 | Patrick |
| 7,146,361 B2 | 12/2006 | Broder et al. |
| 7,222,127 B1 | 5/2007 | Bem et al. |
| 7,231,399 B1 | 6/2007 | Bem et al. |
| 7,243,102 B1 | 7/2007 | Naam et al. |
| 7,249,126 B1 | 7/2007 | Ginsburg et al. |
| 7,266,765 B2 | 9/2007 | Golovchinsky et al. |
| 7,293,016 B1 | 11/2007 | Shakib et al. |
| 7,379,951 B2 | 5/2008 | Chkodrov et al. |
| 7,382,358 B2 | 6/2008 | Kushler et al. |
| 7,395,222 B1 | 7/2008 | Sotos |
| 7,426,507 B1 | 9/2008 | Patterson |
| 7,451,487 B2 | 11/2008 | Oliver et al. |
| 7,499,919 B2 | 3/2009 | Meyerzon et al. |
| 7,516,146 B2 | 4/2009 | Robertson et al. |
| 7,526,470 B1 | 4/2009 | Karnawat et al. |
| 7,533,092 B2 | 5/2009 | Berkhin et al. |
| 7,533,130 B2 | 5/2009 | Narayana et al. |
| 7,552,112 B2 | 6/2009 | Jhala et al. |
| 7,565,363 B2 | 7/2009 | Anwar |
| 7,565,367 B2 | 7/2009 | Barrett et al. |
| 7,566,363 B2 | 7/2009 | Starling et al. |
| 7,574,530 B2 | 8/2009 | Wang et al. |
| 7,584,181 B2 | 9/2009 | Zeng et al. |
| 7,603,350 B1 | 10/2009 | Guha |
| 7,610,282 B1 | 10/2009 | Datar et al. |
| 7,636,714 B1 | 12/2009 | Lamping et al. |
| 7,657,626 B1 | 2/2010 | Zwicky |
| 7,676,507 B2 | 3/2010 | Maim |
| 7,680,775 B2 | 3/2010 | Levin et al. |
| 7,693,818 B2 | 4/2010 | Majumder |
| 7,716,225 B1 | 5/2010 | Dean et al. |
| 7,747,612 B2 | 6/2010 | Thun et al. |
| 7,756,887 B1 | 7/2010 | Haveliwala |
| 7,783,632 B2 | 8/2010 | Richardson et al. |
| 7,801,885 B1 | 9/2010 | Verma |
| 7,809,716 B2 | 10/2010 | Wang et al. |
| 7,818,315 B2 | 10/2010 | Cucerzan et al. |
| 7,818,320 B2 | 10/2010 | Makeev |
| 7,836,058 B2 | 11/2010 | Chellapilla et al. |
| 7,844,589 B2 | 11/2010 | Wang et al. |
| 7,849,089 B2 | 12/2010 | Zhang et al. |
| 7,853,557 B2 | 12/2010 | Schneider et al. |
| 7,856,446 B2 | 12/2010 | Brave et al. |
| 7,877,404 B2 | 1/2011 | Achan et al. |
| 7,895,177 B2 | 2/2011 | Wu |
| 7,925,498 B1 | 4/2011 | Baker et al. |
| 7,925,649 B2 | 4/2011 | Jeh et al. |
| 7,953,740 B1 | 5/2011 | Vadon et al. |
| 7,974,974 B2 | 7/2011 | Tankovich et al. |
| 7,987,185 B1 | 7/2011 | Mysen et al. |
| 8,001,136 B1 | 8/2011 | Papachristou et al. |
| 8,019,650 B2 | 9/2011 | Donsbach et al. |
| 8,024,326 B2 | 9/2011 | Tong et al. |
| 8,024,330 B1 | 9/2011 | Franco et al. |
| 8,027,439 B2 | 9/2011 | Zoldi et al. |
| 8,037,042 B2 | 10/2011 | Anderson et al. |
| 8,037,043 B2 | 10/2011 | Zoeter et al. |
| 8,051,061 B2 | 11/2011 | Niu et al. |
| 8,060,456 B2 | 11/2011 | Gao et al. |
| 8,060,497 B1 | 11/2011 | Zatsman et al. |
| 8,065,296 B1 | 11/2011 | Franz et al. |
| 8,069,182 B2 | 11/2011 | Pieper |
| 8,073,263 B2 | 12/2011 | Hull et al. |
| 8,073,772 B2 | 12/2011 | Bishop et al. |
| 8,073,867 B2 | 12/2011 | Chowdhury |
| 8,082,242 B1 | 12/2011 | Mysen et al. |
| 8,086,599 B1 | 12/2011 | Heymans |
| 8,090,717 B1 | 1/2012 | Bharat et al. |
| 8,156,111 B2 | 4/2012 | Jones et al. |
| 8,224,827 B2 | 7/2012 | Dean et al. |
| 8,239,370 B2 | 8/2012 | Wong et al. |
| 8,412,699 B1 | 4/2013 | Mukherjee et al. |
| 8,458,165 B2 | 6/2013 | Liao et al. |
| 8,583,636 B1 | 11/2013 | Franz et al. |
| 2001/0000356 A1* | 4/2001 | Woods .............................. 707/3 |
| 2002/0034292 A1 | 3/2002 | Tuoriniemi et al. |
| 2002/0042791 A1 | 4/2002 | Smith et al. |
| 2002/0049752 A1 | 4/2002 | Bowman et al. |
| 2002/0103790 A1 | 8/2002 | Wang et al. |
| 2002/0123988 A1 | 9/2002 | Dean et al. |
| 2002/0133481 A1 | 9/2002 | Smith et al. |
| 2002/0165849 A1 | 11/2002 | Singh et al. |
| 2003/0009399 A1 | 1/2003 | Boerner |
| 2003/0018707 A1 | 1/2003 | Flocken |
| 2003/0028529 A1 | 2/2003 | Cheung et al. |
| 2003/0037074 A1 | 2/2003 | Dwork et al. |
| 2003/0078914 A1 | 4/2003 | Witbrock |
| 2003/0120654 A1 | 6/2003 | Edlund et al. |
| 2003/0135490 A1 | 7/2003 | Barrett et al. |
| 2003/0149704 A1 | 8/2003 | Yayoi et al. |
| 2003/0167252 A1 | 9/2003 | Odom et al. |
| 2003/0187837 A1 | 10/2003 | Culliss |
| 2003/0195877 A1 | 10/2003 | Ford et al. |

(56) References Cited

U.S. PATENT DOCUMENTS

| | | |
|---|---|---|
| 2003/0204495 A1 | 10/2003 | Lehnert |
| 2003/0220913 A1 | 11/2003 | Doganata et al. |
| 2003/0229640 A1 | 12/2003 | Carlson et al. |
| 2004/0006456 A1* | 1/2004 | Loofbourrow et al. ............ 704/4 |
| 2004/0006740 A1 | 1/2004 | Krohn et al. |
| 2004/0034632 A1 | 2/2004 | Carmel et al. |
| 2004/0049486 A1 | 3/2004 | Scanlon et al. |
| 2004/0059708 A1 | 3/2004 | Dean et al. |
| 2004/0083205 A1 | 4/2004 | Yeager |
| 2004/0093325 A1 | 5/2004 | Banerjee et al. |
| 2004/0119740 A1 | 6/2004 | Chang et al. |
| 2004/0122811 A1 | 6/2004 | Page |
| 2004/0153472 A1 | 8/2004 | Rieffanaugh, Jr. |
| 2004/0158560 A1 | 8/2004 | Wen et al. |
| 2004/0186828 A1 | 9/2004 | Yadav |
| 2004/0186996 A1 | 9/2004 | Gibbs et al. |
| 2004/0199419 A1 | 10/2004 | Kim et al. |
| 2004/0215607 A1 | 10/2004 | Travis, Jr. |
| 2005/0015366 A1 | 1/2005 | Carrasco et al. |
| 2005/0021397 A1 | 1/2005 | Cui et al. |
| 2005/0027691 A1 | 2/2005 | Brin et al. |
| 2005/0033803 A1 | 2/2005 | Vleet et al. |
| 2005/0050014 A1 | 3/2005 | Gosse et al. |
| 2005/0055342 A1 | 3/2005 | Bharat et al. |
| 2005/0055345 A1 | 3/2005 | Ripley |
| 2005/0060290 A1 | 3/2005 | Herscovici et al. |
| 2005/0060310 A1 | 3/2005 | Tong et al. |
| 2005/0060311 A1* | 3/2005 | Tong et al. ........................ 707/7 |
| 2005/0071741 A1 | 3/2005 | Acharya et al. |
| 2005/0102282 A1 | 5/2005 | Linden |
| 2005/0125376 A1 | 6/2005 | Curtis et al. |
| 2005/0160083 A1 | 7/2005 | Robinson |
| 2005/0192946 A1 | 9/2005 | Lu et al. |
| 2005/0198026 A1 | 9/2005 | Dehlinger et al. |
| 2005/0222987 A1 | 10/2005 | Vadon |
| 2005/0222998 A1* | 10/2005 | Driessen et al. ................. 707/4 |
| 2005/0240576 A1 | 10/2005 | Piscitello et al. |
| 2005/0240580 A1 | 10/2005 | Zamir et al. |
| 2005/0256848 A1 | 11/2005 | Alpert et al. |
| 2006/0036593 A1 | 2/2006 | Dean et al. |
| 2006/0047643 A1 | 3/2006 | Chaman |
| 2006/0069667 A1 | 3/2006 | Manasse et al. |
| 2006/0074903 A1 | 4/2006 | Meyerzon et al. |
| 2006/0089926 A1 | 4/2006 | Knepper et al. |
| 2006/0095421 A1 | 5/2006 | Nagai et al. |
| 2006/0106793 A1 | 5/2006 | Liang |
| 2006/0123014 A1 | 6/2006 | Ng |
| 2006/0173830 A1 | 8/2006 | Smyth et al. |
| 2006/0195443 A1 | 8/2006 | Franklin et al. |
| 2006/0200476 A1 | 9/2006 | Gottumukkala et al. |
| 2006/0200556 A1 | 9/2006 | Brave et al. |
| 2006/0227992 A1 | 10/2006 | Rathus et al. |
| 2006/0230040 A1 | 10/2006 | Curtis et al. |
| 2006/0259476 A1 | 11/2006 | Kadayam et al. |
| 2006/0293950 A1 | 12/2006 | Meek et al. |
| 2007/0005575 A1 | 1/2007 | Dai et al. |
| 2007/0005588 A1 | 1/2007 | Zhang et al. |
| 2007/0038659 A1 | 2/2007 | Datar et al. |
| 2007/0050339 A1 | 3/2007 | Kasperski et al. |
| 2007/0061195 A1 | 3/2007 | Liu et al. |
| 2007/0061211 A1 | 3/2007 | Ramer et al. |
| 2007/0081197 A1 | 4/2007 | Omoigui |
| 2007/0106659 A1 | 5/2007 | Lu et al. |
| 2007/0112730 A1 | 5/2007 | Gulli et al. |
| 2007/0130370 A1 | 6/2007 | Akaezuwa |
| 2007/0156677 A1 | 7/2007 | Szabo |
| 2007/0172155 A1 | 7/2007 | Guckenberger |
| 2007/0180355 A1 | 8/2007 | McCall et al. |
| 2007/0192190 A1 | 8/2007 | Granville |
| 2007/0208730 A1 | 9/2007 | Agichtein et al. |
| 2007/0214131 A1 | 9/2007 | Cucerzan et al. |
| 2007/0233653 A1 | 10/2007 | Biggs et al. |
| 2007/0255689 A1 | 11/2007 | Sun et al. |
| 2007/0260596 A1 | 11/2007 | Koran et al. |
| 2007/0260597 A1 | 11/2007 | Cramer et al. |
| 2007/0266021 A1 | 11/2007 | Aravamudan et al. |
| 2007/0266439 A1 | 11/2007 | Kraft |
| 2007/0288450 A1 | 12/2007 | Datta et al. |
| 2008/0010143 A1 | 1/2008 | Kniaz et al. |
| 2008/0027913 A1 | 1/2008 | Chang et al. |
| 2008/0052219 A1 | 2/2008 | Sandholm et al. |
| 2008/0052273 A1 | 2/2008 | Pickens |
| 2008/0059453 A1 | 3/2008 | Laderman |
| 2008/0077570 A1 | 3/2008 | Tang et al. |
| 2008/0082518 A1 | 4/2008 | Loftesness |
| 2008/0091650 A1 | 4/2008 | Fontoura et al. |
| 2008/0104043 A1 | 5/2008 | Garg et al. |
| 2008/0114624 A1 | 5/2008 | Kitts |
| 2008/0114729 A1 | 5/2008 | Raman et al. |
| 2008/0114750 A1 | 5/2008 | Saxena et al. |
| 2008/0133508 A1* | 6/2008 | Jiang et al. ........................ 707/5 |
| 2008/0140699 A1* | 6/2008 | Jones et al. .................... 707/102 |
| 2008/0162475 A1 | 7/2008 | Meggs et al. |
| 2008/0183660 A1 | 7/2008 | Szulczewski |
| 2008/0189269 A1 | 8/2008 | Olsen |
| 2008/0208825 A1 | 8/2008 | Curtis et al. |
| 2008/0228442 A1 | 9/2008 | Lippincott et al. |
| 2008/0256050 A1 | 10/2008 | Zhang et al. |
| 2008/0313168 A1 | 12/2008 | Liu et al. |
| 2008/0313247 A1 | 12/2008 | Galvin |
| 2009/0006438 A1 | 1/2009 | Tunkelang et al. |
| 2009/0012969 A1 | 1/2009 | Rail et al. |
| 2009/0055392 A1 | 2/2009 | Gupta et al. |
| 2009/0070194 A1 | 3/2009 | Song |
| 2009/0157643 A1 | 6/2009 | Gollapudi et al. |
| 2009/0182723 A1 | 7/2009 | Shnitko et al. |
| 2009/0187557 A1 | 7/2009 | Hansen et al. |
| 2009/0228442 A1 | 9/2009 | Adams et al. |
| 2009/0287656 A1 | 11/2009 | Bennett |
| 2009/0313242 A1 | 12/2009 | Kodama |
| 2010/0106706 A1 | 4/2010 | Rorex et al. |
| 2010/0131563 A1 | 5/2010 | Yin |
| 2010/0205541 A1 | 8/2010 | Rapaport et al. |
| 2010/0228738 A1* | 9/2010 | Mehta et al. ................... 707/748 |
| 2010/0241472 A1 | 9/2010 | Hernandez |
| 2010/0299317 A1 | 11/2010 | Uy |
| 2010/0325131 A1 | 12/2010 | Dumais et al. |
| 2011/0064795 A1 | 3/2011 | Tosi et al. |
| 2011/0179093 A1 | 7/2011 | Pike et al. |
| 2011/0219025 A1 | 9/2011 | Lipson et al. |
| 2011/0264670 A1 | 10/2011 | Banerjee et al. |
| 2011/0282906 A1 | 11/2011 | Wong |
| 2011/0295844 A1 | 12/2011 | Sun et al. |
| 2011/0295879 A1 | 12/2011 | Logis et al. |
| 2012/0011148 A1 | 1/2012 | Rathus et al. |
| 2012/0191705 A1 | 7/2012 | Tong et al. |

FOREIGN PATENT DOCUMENTS

| | | |
|---|---|---|
| WO | WO 01/67297 | 9/2001 |
| WO | WO 2004/059514 | 7/2004 |

OTHER PUBLICATIONS

Vélez, Bienvenido, et al. "Fast and effective query refinement." ACM SIGIR Forum. vol. 31. No. SI. ACM, 1997.*

Mandala, Rila, Takenobu Tokunaga, and Hozumi Tanaka. "Combining multiple evidence from different types of thesaurus for query expansion." Proceedings of the 22nd annual international ACM SIGIR conference on Research and development in information retrieval. ACM, 1999.*

U.S. Appl. No. 10/726,345, filed Dec. 3, 2003, Pearson et al., System and Methods for Improved Searching.

U.S. Appl. No. 10/878,926, filed Jun. 28, 2004, Battle et al., Systems and Methods for Deriving and Using an Interaction Profile.

U.S. Appl. No. 11/156,086, filed Nov. 2, 2006, Diligenti et al., Search Result Inputs Using Stop Word Generalized Queries.

U.S. Appl. No. 11/556,100, filed Nov. 2, 2006, Diligenti et al., Search Result Inputs Using Variant Generalized Queries.

U.S. Appl. No. 11/556,143, filed Nov. 2, 2006, Kim et al., Modifying Search Result Ranking Based on Implicit User Feedback.

(56) References Cited

OTHER PUBLICATIONS

U.S. Appl. No. 11/647,888, filed Dec. 29, 2006, Baker et al. Ensuring That a Synonym for a Query Phrase Does Not Drop Information Present in the Query Phrase.
U.S. Appl. No. 11/651,282, filed Jan. 9, 2007, Heymans, Method and Apparatus for Automatically Identifying Compounds.
U.S. Appl. No. 11/685,095, filed Mar. 12, 2007, Kim et al., Modifying Search Result Ranking Based on Implicit User Feedback and a Model of Presentation Bias.
U.S. Appl. No. 11/686,288, filed Mar. 14, 2007, Diligenti et al., Detecting Click Spam.
U.S. Appl. No. 11/742,447, filed Apr. 30, 2007, Stets et al., Modifying Search Result Ranking Based on a Temporal Element of User Feedback.
U.S. Appl. No. 11/781,155, filed Jul. 20, 2007, Diligenti et al., Search Result Inputs Using Generalized Queries.
U.S. Appl. No. 11/841,313, filed Aug. 20, 2007, Corduneanu et al., Modifying Search Result Ranking Based on Populations.
U.S. Appl. No. 11/870,893, filed Oct. 11, 2007, McDonnell, Time Based Ranking.
U.S. Appl. No. 12/166,617, filed Jul. 2, 2008, Yang, Determining Whether Numbers in Different Language Formats are Synonymous.
U.S. Appl. No. 12/166,718, filed Jul. 2, 2008, Upstill et al., Identifying Common Co-Occurring Elements in Lists.
U.S. Appl. No. 12/331,872, filed Dec. 10, 2008, Ie et al., Sharing Search Engine Relevance Data Between Corpora.
U.S. Appl. No. 12/551,052, filed Aug. 31, 2009, Kim et al., Refining Search Results.
U.S. Appl. No. 12/572,739, filed Oct. 2, 2009, McDonnell et al., Recent Interest Based Relevance Scoring.
U.S. Appl. No. 12/506,203, filed Jul. 20, 2009, Tong et al. Generating a Related Set of Documents for an Initial Set of Documents.
U.S. Appl. No. 12/717,064, filed Mar. 3, 2010, Kuramochi et al., Framework for Testing Search Result Hypotheses.
U.S. Appl. No. 12/632,279, filed Dec. 7, 2009, Serboncini et al., Dentification and Uses of Search Entity Transition Probabilities.
U.S. Appl. No. 12/756,749, filed Apr. 8, 2010, Lopatenko et al, Ranking Search Results Based on Similar Queries.
U.S. Appl. No. 12/723,973, filed Mar. 15, 2010, Nerurkar, Ranking Search Results Based on Anchors.
U.S. Appl. No. 12/717,475, filed Mar. 4, 2010, Thakur, et al., Deriving Site Reputation and Focus from User Feedback Statistics.
U.S. Appl. No. 12/623,276, filed Nov. 20, 2009, Kim et al., Modifying Scoring Data Based on Historical Changes.
U.S. Appl. No. 12/699,549, filed Feb. 3, 2010, Fernandes et al., Evaluating Website Properties by Partitioning User Feedback.
U.S. Appl. No. 12/718,634, filed Mar. 5, 2010, Kim et al., Temporal-Based Score Adjustments.
U.S. Appl. No. 12/842,345, filed Jul. 23, 2010, Chen et al., Combining User Feedback.
U.S. Appl. No. 12/982,633, filed Dec. 30, 2010, Adams et al., Modifying Ranking Data Based on Document Changes.
U.S. Appl. No. 13/310,901, filed Dec. 5, 2011, Kim et al., Refining Search Results.
Agichtein, et al; *Improving Web Search Ranking by Incorporating User Behavior Information*; Aug. 2006; Proceedings of the Twenty-Ninth Annual International ACM SIGIR Conference on Research and Development in Information Retrieval, p. 19-26.
Agichtein, et al; *Learning User Interaction Models for Predicting Web Search Result Performances*; Aug. 2006; Proceedings of the Twenty-Ninth Annual International ACM SIGIR Conference on Research and Development in Information Retrieval, p. 3-10.
Bar-Llan et al., "Presentation Bias is Significant in Determining User Preference for Search Results—A User Study"; Journal of the American Society for Information Science and Technology, vol. 60, Issue 1 (p. 135-149), Sep. 2008, 15 pages.
Bar-Llan et al.; "Methods for comparing rankings of search engine results"; Computer Networks: The International Journal of Computer and Telecommunications Networking, Jul. 2006, vol. 50, Issue 10, 19 pages.

Boldi, et al.; *The Query-flow Graph: Model and Applications*; CKIM'08, Oct. 26-30, Napa Valley, California, USA, pp. 609-617.
Boyan et al.; *A Machine Learning Architecture for Optimizing Web Search Engines*; Aug. 1996; Internet-based information systems-Workshop Technical Report—American Association for Artificial Intelligence, p. 1-8.
Burke, Robin, Integrating Knowledge-based and Collaborative-filtering Recommender Systems, AAAI Technical Report WS-99-01. Compilation copyright © 1999, AAAI (www.aaai.org), pp. 69-72.
Craswell, et al.; *Random Walks on the Click Graph*; Jul. 2007; SIGIR '07, Amsterdam, the Netherlands, 8 pages.
Cutrell, et al.; *Eye tracking in MSN Search: Investigating snippet length, target position and task types*; 2007; Conference on Human Factors in Computing Systems—Proceedings of the SIGCHI Conference on Human Factors in Computing Systems.
Diligenti, et al., *Users, Queries and Documents: A Unified Representation for Web Mining*, wi-iat, vol. 1, 2009 IEEE/WIC/ACM International Joint Conference on Web Intelligence and Intelligent Agent Technology, 2009, pp. 238-244.
Hofmann, Thomas, *Latent Semantic Models for Collaborative Filtering*, ACM Transactions on Information Systems, vol. 22, No. 1, Jan. 2004, pp. 89-115.
Google News archive, Jul. 8, 2003, Webmasterworld.com, [online] Retrieved from the Internet http://www.webmasterwolrd.com/forum3/15085.htm [retrieved on Nov. 20, 2009] 3 pages.
Grčar, Miha, *User Profiling: Collaborative Filtering*, SIKDD 2004, Oct. 12-15, 2004, Ljubljana, Slovenia, 4 pages.
Joachims, T., Evaluating retrieval performance using clickthrough data. Proceedings of the SIGIR Workshop on Mathematical/Formal Methods in Information Retrieval; Aug. 12-15, 2002; Tampere, Finland, 18 pages.
Joachims; *Optimizing search engines using clickthrough data*; 2002; Proceedings of the ACM SIGKDD International Conference on Knowledge Discovery and Data Mining, p. 133-142.
Joachims et al., "Search Engines that Learn from Implicit Feedback"; Aug. 2007, IEEE Computer Society.
Kelly, et al.; *Implicit Feedback for Inferring User Preference: A Bibliography*; SIGIR Forum, vol. 37, No. 2 (2003), pp. 18-28.
Linden, Greg et al., Amazon.com *Recommendations: Item-to-Item Collaborative Filtering*, [online], http://computer.org/internet/, IEEE Internet Computing, Jan.-Feb. 2003, IEEE Computer Society, pp. 76-80.
Lu, Kuen S., Examiner, U.S. Patent Office, U.S. Appl. No. 11/556,143, filed Nov. 2, 2006, in Office Action mailed Jan. 25, 2010, 14 pages.
Lu, Kuen S., Examiner, U.S. Patent Office, U.S. Appl. No. 11/556,143, filed Nov. 2, 2006, in Office Action mailed Jul. 6, 2010, 20 pages.
Lu, Kuen S., Examiner, U.S. Patent Office, U.S. Appl. No. 11/556,143, filed Nov. 2, 2006, in Office Action mailed Apr. 20, 2011, 18 pages.
Nicole, Kristen, Heeii is StumbleUpon Plus Google Suggestions, [online], Retrieved from the Internet http://mashable.com/2007/05/15/heeii/, 11 pages.
Lemire, Daniel, *Scale and Translation Invariant Collaborative Filtering Systems*, Published in Information Retrieval, 8(1), pp. 129-150, 2005.
Mueller, Kurt A., Examiner, U.S. Patent Office, U.S. Appl. No. 11/685,095, filed Mar. 12, 2007, in Office Action mailed Feb. 8, 2010, 31 pages.
Mueller, Kurt A., Examiner, U.S. Patent Office, U.S. Appl. No. 11/685,095, filed Mar. 12, 2007, in Office Action mailed Feb. 25, 2009, 21 pages.
Mueller, Kurt A., Examiner, U.S. Patent Office, U.S. Appl. No. 11/685,095, filed Mar. 12, 2007, in Office Action mailed Sep. 10, 2009, 23 pages.
Mueller, Kurt A., Examiner, U.S. Patent Office, U.S. Appl. No. 11/685,095, filed Mar. 12, 2007, in Office Action mailed Apr. 13, 2011, 31 pages.
Radlinski, et al., *Query Chains: Learning to Rank from Implicit Feedback*, KDD '05, Aug. 21-24, 2005, Chicago, Illinois, USA, 10 pages.

(56) References Cited

OTHER PUBLICATIONS

Rahman, Sabana, Examiner, U.S. Patent Office, U.S. Appl. No. 11/556,086, filed Nov. 2, 2006, in Office Action mailed Jun. 23, 2010, 21 pages.
Schwab, et al., *Adaptivity through Unobstrusive Learning*, 2002, 16(3), pp. 5-9.
Stoilova, Lubomira et al., *GiveALink: Mining a Semantic Network of Bookmarks for Web Search and Recommendation*, LinkKDD '05, Aug. 21, 2005, Chicago, IL, USA, 8 pages.
W3C, URIs, URLs and URNs: Classification and Recommendations 1.0, Report from the joint W3C/IETF URI Planning Interest Group, Sep. 21, 2001, 8 pages.
Xiao, et al., *Measuring Similarity of Interests for Clustering Web-Users*, ADC, 2001, pp. 107-114.
Xie et al., *Web User Clustering from Access Log Using Belief Function*, K-CAP '01, Oct. 22-23, 2001, Victoria, British Columbia, Canada, pp. 202-208.
Yu et al., *Selecting Relevant Instances for Efficient and Accurate Collaborative Filtering*, CIKM '01, Nov. 5-10, 2001, Atlanta, Georgia, pp. 239-246.
Zeng et al., *Similarity Measure and Instance Selection for Collaborative Filtering*, WWW '03, May 20-24, 2003, Budapest, Hungary, pp. 652-658.
Zeng, et al., "Learning to Cluster Web Search Results", SIGIR '04, Proceedings of the 27th Annual International ACM SIGIR conference on research and development in information retrieval, 2004.
Soumen Chakrabarti, et al. "Enhanced Topic Distillation using Text, Markup tags, and Hyperlinks" ACM, Sep. 9-12, 2001, pp. 208-216.
Gabriel Somlo et al., "Using Web Hepler Agent Profiles in Query Generation", ACM, Jul. 2003, pp. 812-818.
Australian Examiner, Tim Yang, Australian Patent Office Non-Final Office Action in AU App. Ser. No. 2004275274, mailed Feb. 3, 2010, 2 pages.
Dan Olsen et al., "Query-by-critique: Spoken Language Access to Large Lists", ACM, Oct. 2002, pp. 131-140.
Susan Gauch et al., "A Corpus Analysis Approach for Automatic Query Expansion and its Extension to Multiple Databases", ACM, Jul. 1999, pp. 250-269.
Nicolas Bruno et al., "Top-K Selection Queries over Relational Databases: Mapping Strategies and Performance Evaluation", ACM, Jun. 2002, pp. 153-187.
Ji-Rong Wen et al., "Query Clustering using User Logs", ACM, Jan. 2002, pp. 59-81.
Brin, S. and L. Page, The Anatomy of a Large-Scale Hypertextual Web Search Engine, Computer Science Department, Apr. 1998.
European Examiner Marja Brouwers, International Search Report and Written Opinion for Application No. PCT/US2004/029615, dated Jan. 19, 2005, 8 pages.
Hungarian Patent Office, Examiner Judit Hajdu, International Search Report and Written Opinion for Application No. 200806756-3, dated Nov. 19, 2010 12 pages.
Authorized Officer Athina Nickitas-Etienne, International Preliminary Report and Written Opinion for Application No. PCT/US2004/029615, mailed Mar. 23, 2006.
Indian Examiner Prem Nath, Indian Office Action in Indian Application No. 686/KOLNP/2006, mailed Jun. 3, 2008, 2 pages.
Danish Examiner Henrik Ebbesen Jensen, Danish Search Report and Written Opinion for Application No. 200601630-7, dated Jun. 21, 2007, 15 pages.
Jones et al., "Pictures of Relevance: A Geometric Analysis of Similarity Measures", Journal of the American Society for Information Science, Nov. 1987, 23 pages.
Kaplan et al., "Adaptive Hypertext Navigation Based on User Goals and Context", User Modeling and User-Adapted Interaction 2, Sep. 1, 1993; pp. 193-220, 28 pages.
Liddy et al., "A Natural Language Text Retrieval System With Relevance Feedback", 16th National Online, May 2-6, 1995, 3 pages.
Joachims, "Evaluating Search Engines Using Clickthrough Data", Cornell University, Department of Computer Science, Draft, Feb. 19, 2002, 13 pages.
Jansen et al., "An Analysis of Web Documents Retrieved and Viewed", School of Information Sciences and Technology, The Pennsylvania State University, the 4th International Conference on Internet Computing, Las Vegas, Nevada, pp. 65-69, Jun. 23-26, 2003, 5 pages.
U.S. Appl. No. 14/143,622, filed Dec. 30, 2013, Kim et al.
U.S. Appl. No. 13/953,162, filed Jul. 29, 2013, Kim et al.
U.S. Appl. No. 12/825,461, filed Jun. 29, 2010, Kim et al.
U.S. Appl. No. 13/617,019, filed Sep. 14, 2012, Tong et al.
U.S. Appl. No. 13/898,363, filed May 20, 2013, Tong et al.
"Personalizing Search via Automated Analysis of Interests and Activities," by Teevan et al. IN: SIGIR'05 (2005), 8 pages.
Soumen Chakrabarti, et al. "Enhanced Topic Distillation using Text, Markup tags, and Hyperlinks". ACM, Sep. 9-12, 2001, pp. 208-216.

\* cited by examiner

RANKING SEARCH RESULTS BASED ON SIMILAR QUERIES

CROSS-REFERENCE TO RELATED APPLICATIONS

This application is a continuation of U.S. application Ser. No. 12/756,749 to Andrei Lopatenko et al., entitled "Ranking Search Results Based on Similar Queries," and filed Apr. 8, 2010, which claims priority to U.S. Provisional Patent Application Ser. No. 61/313,356 to Andrei Lopatenko, et al., entitled "Ranking Search Results Based on Similar Queries," and filed Mar. 12, 2010, and to U.S. Provisional Patent Application Ser. No. 61/167,698 to Andrei Lopatenko, et al., entitled "Ranking Search Results Based on Similar Queries," and filed Apr. 8, 2009, the contents of each are incorporated herein by reference.

BACKGROUND

The present disclosure relates to ranking of search results.

Internet search engines typically operate by storing information about many web pages, which they retrieve from the World Wide Web (WWW) using a Web crawler that follows hyperlinks on pages it encounters. The contents of each page are typically analyzed to determine how the page should be indexed (for example, words are extracted from the titles, headings, or special fields called meta tags). Data about web pages are stored in an index database for use in later queries. When a user enters a query into a search engine, the search engine examines its index and provides a listing of best-matching web pages according to its criteria, usually with a short summary containing the document's title and sometimes parts of the text. While there may be millions of web pages that include a particular word or phrase, some pages may be more relevant, popular, or authoritative than others. Most search engines employ techniques to rank the results to provide the "best" results first.

SUMMARY

This specification describes technologies relating to database query processing.

In general, one aspect of the subject matter described in this specification can be embodied in a method for providing input to a document ranking process for ranking a plurality of documents, the document ranking process taking as input a quality of result statistic for an individual document in the plurality of documents, the plurality of documents having been identified in response to a query, the quality of results statistic being for the query and the individual document. The method for providing input can include, for a first document identified as a search result of a user-submitted query, scoring one or more other queries based upon a similarity to the user-submitted query, each of the one or more other queries being different from the user-submitted query.

Scoring each of the other queries can include determining a weight for each term in the other query based upon a similarity to at least one term in the user-submitted query. Scoring each of the other queries can further include combining the determined weights into a respective score for the other query.

The method for providing input can further include selecting one or more of the other queries based on each of the respective scores of the other queries. The method for providing input can also include deriving a first quality of result statistic for the first document from respective data associated with at least one of the selected queries, the respective data being indicative of user behavior relative to the first document as a search result for the at least one selected queries.

The method for providing input can additionally include providing the first quality of result statistic as the quality of result statistic input to the document ranking process for the first document and the user-submitted query. Other embodiments of this aspect include corresponding systems, apparatus, and computer program products.

These and other embodiments can optionally include one or more of the following features. The method for providing input can include determining the respective score for the other query by multiplying the determined weights, where a determined weight for an optional term in the other query determined to not be similar to any of the terms in the user-submitted query is a penalty weight that decreases the respective score. Determining the respective score for the other query can further include averaging the weights of the terms in the other query and decreasing the respective score by a penalty amount for the terms in the other query that are in a different order than the terms in the user-submitted query. Determining the respective score for the other query can include linearly approximating a difference between a product of the determined weights and a sum of the determined weights. Selecting one or more of the other queries can be selecting one query having a greatest respective score. The respective data can be aggregated click data. The method for providing input can include limiting the first quality of result statistic for the first document according to a threshold. The method for providing input can include reducing the first quality of result statistic for the first document by an amount based upon a degree of dissimilarity between the first document and at least one of the terms in the user-submitted query.

Determining the weight for the term in the other query can include one or more of the following: determining a first weight indicative of a maximum similarity for the term in the other query that is the same as a required term in the user-submitted query; determining a second weight indicative of a degree of similarity for the term in the other query that is a stem or a synonym of a required term in the user-submitted query; determining a third weight for the term in the other query that is the same as an optional term in the user-submitted query; and determining a fourth weight for the term in the other query that is the same as a stopword term in the user-submitted query, the stopword term being an article, a conjunction, a preposition, or a pronoun.

The method for providing input can further include assigning a minimum respective score to the other query if the other query does not have a term that is the same as a required term in the user-submitted query, or is a stem of the required term, or is a synonym of the required term. Determining the weight for the term can further include determining a first weight indicative of a degree of similarity for the term in the other query that differs from a term in the user-submitted query by at least one diacritical character. A locale from which the user-submitted query originated can use diacritical characters interchangeably with non-diacritical characters. Combining can include aggregating the data associated with the first selected query weighted by a respective score for the first selected query with the data associated with a second selected query weighted by a respective score for the second selected query.

In general, another aspect of the subject matter described in this specification can be embodied in a method for providing input to a document ranking process for ranking a plurality of documents, the document ranking process taking as input a quality of result statistic for an individual document in the plurality of documents, the plurality of documents having been identified in response to a query, the quality of results statistic being for the query and the individual document. The method for providing input can further include, for a first document identified as a search result of a user-submitted query, scoring each of a plurality of other queries to have a respective score based upon similarity to the user-submitted query, each of the other queries being different from the user-submitted query. The method for providing input can additionally include selecting a plurality of the other queries based on each of the respective scores of the other queries; determining a combined quality of result statistic for the first document from a combination of respective data associated with each of the selected other queries, each respective data being indicative of user behavior relative to the first document as a search result for the selected other query associated with the respective data; and providing the combined quality of result statistic as the quality of result statistic input to the document ranking process for the first document and the user-submitted query. Other embodiments of this aspect include corresponding systems, apparatus, and computer program products.

These and other embodiments can optionally include one or more of the following features. Determining the combined quality of result statistic can include aggregating respective data associated with each of the selected other queries weighted by a factor based upon the respective scores for the selected other queries. Determining the combined quality of result statistic can include aggregating respective data associated with each of the selected other queries, where an amount of respective data that can be aggregated from a single selected other query is limited to a threshold amount. The respective data from a selected other query having a greatest respective score of the selected other queries can not be limited to a threshold amount.

Determining the combined quality of result statistic can include aggregating respective data associated with each of the selected other queries one selected query at a time until a threshold level of aggregate respective data has been reached. The respective data can be aggregated click data.

A first combined quality of result statistic can be the combined quality of result statistic and the method for providing input can further include: for a second document identified as a search result of the user-submitted query, determining a second combined quality of result statistic for the second document from a combination of respective second data associated with each of the selected other queries, each respective second data being indicative of user behavior relative to the second document as a search result for the selected other query associated with the respective second data; and adjusting the first combined quality of result statistic for the first document based at least in part upon a comparison between the first quality of result statistic and the second combined quality of result statistic for the second document.

A first set of respective scores can be the respective scores of a first group of the selected other queries, the first group can be the selected other queries for which there is respective data associated with the first document; a second set of respective scores can be the respective scores of a second group of the selected other queries, the second group can be the selected other queries for which there is respective data associated with the second document, where the first group and the second group differ; and adjusting can include the first quality of result statistic being adjusted based upon a comparison between the first set of respective scores and a second set of respective scores.

Each of the selected other queries can have a respective score greater than a respective score for each the other queries that are not selected.

Particular embodiments of the invention can be implemented to realize one or more of the following advantages. Historical queries that are similar to a user input query can be identified and ranked according to a degree of similarity. Similarity can be determined based at least in part on variants of terms in the user input query. Diacritical variants can be used to determine similarity when appropriate for a locale from which the user input query originated. User behavior data can be borrowed from historical queries that are similar to the user input query when there is insufficient user behavior data associated with the user input query. User behavior data associated with multiple historical queries can be combined and used for the user input query. At least some of these advantages can permit the results for a user input query to be adjusted based on relevance indicated by user behavior even when there is insufficient user behavior data associated with the user input query.

As another advantage, historical queries can provide additional information relevant to the user input query which is not contained directly in the user input query. Such additional information can include, for example, information that provides a timeframe for a user input query or information that clarifies a user input query. For example, the historical query "conference on mobile data management 2009" can indicate that the user input query "conference on mobile data management" is additionally relevant to 2009.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
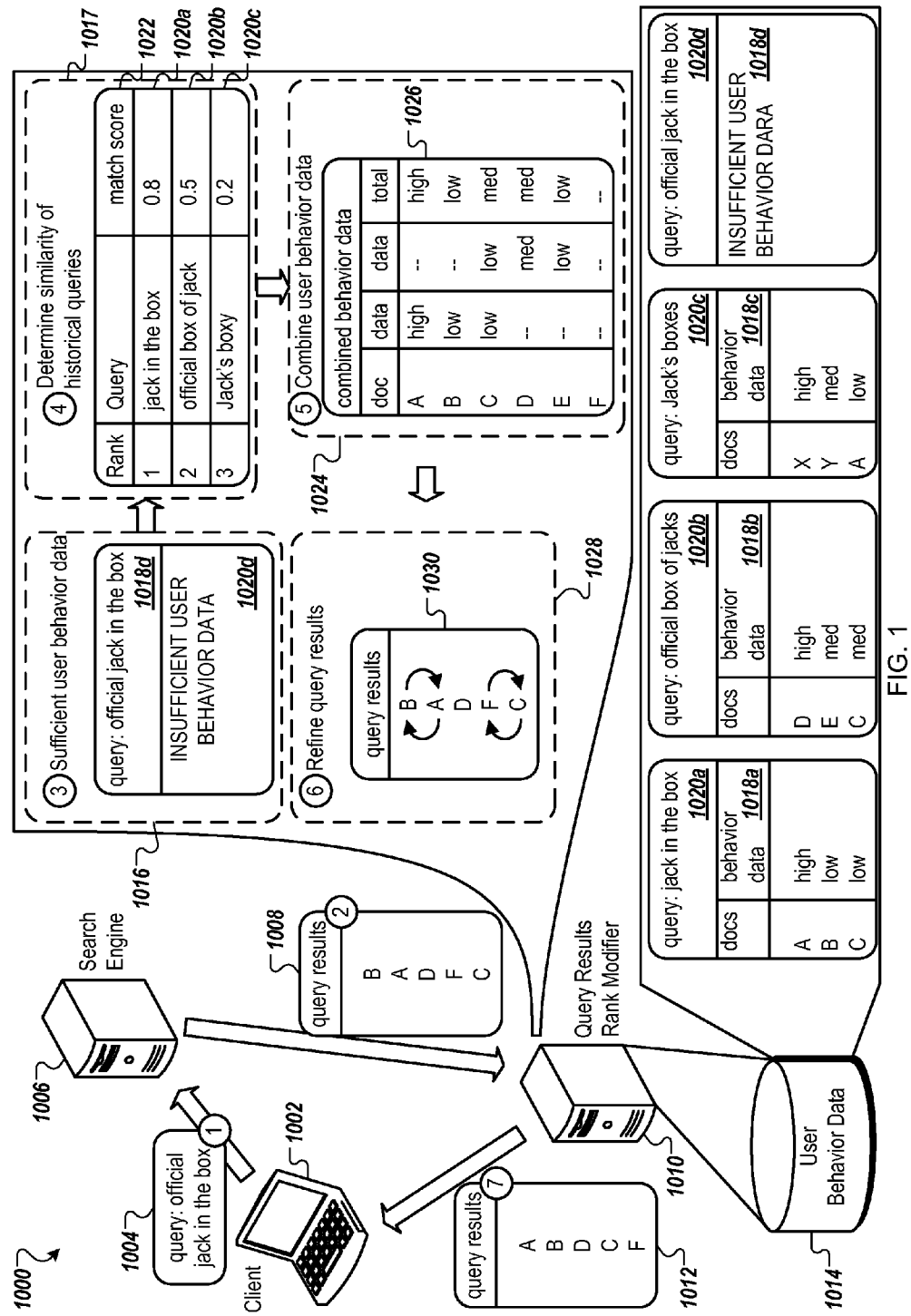
FIG. 1 shows a diagram illustrating improvement of query results from a search engine through identification of historical queries that are similar to an input query for the purpose of borrowing user behavior data.

FIG. 1 shows a diagram 1000 illustrating improvement of query results from a search engine through identification of historical queries that are similar to an input query for the purpose of borrowing user behavior data. In various implementations, a client 1002 submits an input query 1004 to a search engine 1006 and the search engine 1006 returns results to the client 1002. The results produced by the search engine 1006 are an ordered list of documents determined to be responsive to the input query 1004, with the most relevant documents being provided at the top of the list. The search engine 1006 determines relevance based, at least in part, on document content. The diagram 1000 shows an example framework for improving the results provided to the client 1002 (e.g., promoting results that are more relevant and demoting results that are less relevant) by the search engine 1006 through the use of a query results rank modifier 1010 module.

The query results rank modifier 1010 can alter the order of results based upon quality of result statistics for documents. A quality of result statistic for a document is derived from user behavior data associated with the document. One example of user behavior data is "click data." Click data refers to how long a user views or "dwells" on a document after clicking on it in the results for a query. For example, a longer time spent dwelling on a document, termed a "long click", can indicate that a user found the document to be relevant for their query. A brief period viewing a document, termed a "short click", can be interpreted as a lack of document relevance. Another type of user behavior data is based on tracking eye movements of users as they view search results. Other types of user behavior data are possible. In various implementations, the click data is a count of each click type (e.g., long, medium, short) for a particular historical query (a query previously submitted to the search engine 1006) and document combination. Click data from a historical query for a given document can be used to create a quality of result statistic for that document. By way of illustration, a quality of result statistic can be a weighted average of the count of long clicks for a given document and query. Other ways of determining a quality of result statistic for a document are possible.

Another example of user behavior data is purchase decision data. Such user behavior data can be based on, for example, products searched for by consumers, products viewed by consumers, details regarding the viewing of products, and products purchased by consumers.

In various implementations and by way of illustration, user behavior data is generated by a process that creates a record for documents that are selected by users in response to a specific query. Each record (herein referred to as a tuple: <document, query, data>) comprises a query submitted by users, a document reference indicating the document selected by users in response to the query, and an aggregation of click data for all users or a subset of all users that selected the document reference in response to the query. In some implementations, extensions of this tuple based approach to user behavior data are possible. For instance, the user behavior data can be extended to include location-specific (e.g. country, state, etc) or language-specific identifier. With such identifiers included, a country-specific tuple would include the country from where the user query originated from in whereas a language-specific tuple would include the language of the user query.

The query results rank modifier 1010 can refine results 1008 produced by the search engine 1006 based on quality of result statistics for a historical query that is the same as the input query 1004. To perform this refinement, the query results rank modifier 1010 derives the quality of result statistics from user behavior data. In the absence of sufficient user behavior data for a historical query that is the same as the input query 1004, the query results rank modifier 1010 can use or "borrow" user behavior data from historical queries that are similar to the input query 1004.

By way of illustration, assume there is a sufficient amount of user behavior data associated with the historical query "pinewood derby car kit" but there is no user behavior data for the historical query "official pinewood derby car kit." If the query results rank modifier 1010 receives query results from the search engine 1006 for the input query "official pinewood derby car kit," it can refine the results by borrowing the user behavior data associated with a similar historical query, "pinewood derby car kit." Thus, instead of not refining the results for a lack user behavior data, the query results rank modifier 1010 is able improve the results using user behavior data for a similar query.

The diagram 1000 shows an example of identifying similar historical queries and borrowing user behavior data from the identified similar historical queries. There are two general parts to the diagram 1000. The first part illustrates identifying historical queries that are similar to the input query 1004. The first part is addressed by table 1022 and steps 1016 and 1017. Once similar historical queries have been identified, user behavior data from a selection of those similar historical queries can be combined. The second part illustrates combining user behavior data from the selected historical queries. The second part is addressed by step 1024 and table 1026.

As described above, the client 1002 submits the input query 1004 to the search engine 1006. The input query 1004 is "official jack in the box." The search engine 1006 runs a search and, based on document content, produces search engine query results 1008. The search engine query results 1008 list documents B, A, D, F, and C in descending order of relevance. These documents can be a variety of things, including web pages on the internet and files on a local computer.

The search engine 1006 sends the search engine query results 1008 to the query results rank modifier 1010. For each document in the search engine query results 1008, the query results rank modifier 1010 proceeds to step 1016 to determine whether there is a sufficient amount of user behavior data associated with a historical query matching the input query 1004. To perform step 1016, the query results rank modifier 1010 refers to a data repository 1014 storing user behavior data 1018*a-d* for historical queries 1020*a-d*. The historical query 1020*d* matches the input query 1004. Since the user behavior data 1018*d* associated with the historical query 1020*d* is insufficient for refining the search engine query results 1008, the query results rank modifier 1010 proceeds to step 1017.

At step 1017, the query results rank modifier 1010 determines the similarity of historical queries 1020*a-c* to the input query 1004. The historical queries 1020*a-c* are "jack in the box," "official box of jacks," and "Jack's boxes," respectively. As part of determining similarity, the query results rank modifier 1010 assigns each historical query 1020*a-c* a match score between 0.0 and 1.0. The match score is a measure of how similar a historical query is to the input query 1004. A match score of 1.0 indicates an exact match and a match score of 0.0 indicates there is a no similarity, for example.

In some implementations, to assign a match score to a historical query, the query results rank modifier compares each term of the input query 1004 against the terms of the historical query. When a term of the input query 1004 is found to match a term in the historical query, a weight for the matching term is included in a tally for the historical query. Once each term of the input query 1004 has been compared and each matching weight as been included in the tally, a match score for the historical query is determined based upon the final tally. The match score can be determined from these weights using a variety of techniques, as described in further detail below.

The weights for matching terms are based on a type of term that has matched. There are four types of terms: regular terms, variant terms, optional terms, and stopword terms. Other types of terms are possible. Regular terms are terms that, given their context within an input query, are considered to be important or necessary (e.g., "jack"). Regular terms receive a weight of 1.0, for example. Variant terms are also terms that, given their context within an input query, are considered to be important or necessary (e.g., "box"). Unlike a regular term, a variant term can be substituted by a stem (e.g., "box" is a stem of "boxes"), a synonym (e.g., "car" is a synonym of "auto"), or a diacritical variant (e.g., "cliche" is a diacritical variant of "cliché") of the variant term. Variants of a variant term can receive a weight that depends on a degree of similarity to the variant term within the context of the input query, for instance. Optional terms are terms that, given their context within an input query, are not considered to be necessary or to have a high degree of importance (e.g., "official"). Optional terms can receive a weight less than the weight of a variant term. Stopwords are articles, conjunctions, prepositions, and pronouns (e.g., "in," "the"). Stopwords can receive a weight less than the weight of an optional term.

As an illustrative example, the quality results rank modifier 1010 determines the following match scores for the historical queries 1020a-c when compared against the input query 1004: 0.8, 0.5, and 0.2, respectively. Table 1022 shows that the historical query 1020a has the greatest match score, the historical query 1020b is next, and the historical query 1020d has the lowest match score.

The query results rank modifier 1010 then selects one or more of the historical queries 1020a-c based upon the match scores. User behavior data from the selected historical queries can be used for the refining the search engine query results 1008 for the input query 1004. A variety of selection techniques can be employed, as described in further detail below. In this example, the query results rank modifier 1010 selects to historical queries with the top two match scores, which is the historical query 1020a and the historical query 1020b.

Next, the query results rank modifier 1010 combines the user behavior data 1020a-b for the selected historical queries 1018a-b at step 1024. For purposes of ease of explanation, the user behavior data is represented simply by three tags: "high," "med," and "low." In this example, "high" user behavior data for a document indicates there is a high amount of favorable user behavior data regarding the document for the associated historical query. Favorable user behavior data is data that potentially indicates the document is relevant to the historical query, such as long click data. For example, "high" user behavior data for document A can indicate that a large number of users have viewed document A for a long period of time after clicking on it in the results for the historical query 1020a. Although this not a definitive indication of document A's relevance to historical query 1020a (many additional factors are considered in making this determination), it possibly indicates that users viewed document A for a long period of time because its content to be relevant to historical query 1020a.

A variety of techniques of combining user behavior data can be used, as described in further detail below. In this example, the user behavior data 1018a-b associated with each of the selected historical queries 1020a-b is combined by weighting the user behavior data 1018a-b for each document by the match score for the associated historical query 1020a-b. For purposes of this example, user behavior data 1018a weighted by the match score for historical query 1020a (0.8) does not change and user behavior data 1018b weighted by the match score for historical query 1020b (0.5) is reduced by one tag (e.g., from "high" to "med"). The weighted user behavior data 1018a is combined with the weighted user behavior data 1018b for each document, as shown in table 1026. For example, user behavior data 1018a for document C is weighted by the match score for the associated historical query 1020a ("low"*0.8="low") and combined with user behavior data 1018b for document C that is weighted by the match score for the associated historical query 1020b ("med"*0.5="low"). The result is a combined user behavior data for document C (in this example, "low"+"low"="med").

The combined user behavior data can be used to derive quality of result statistics for the documents, as described above. The quality of result statistics can be used by the query results rank modifier 1010 to refine the rankings of the search engine query results 1008 at step 1028.

At step 1028, the query results rank modifier refines the search engine query results 1008 using the quality of result statistics for the combined user behavior data 1026. As presented for demonstrative purposes in table 1030, the rankings for documents A and C are increased and the rankings for documents B and F are decreased. The refinement of rankings takes into account many factors, including the information retrieval ("IR") score and the quality of result statistics score for each document. The IR score is determined, at least in part, by the search engine 1006 and is taken into account in creating the search engine query results 1008.

Once the refinement of the search engine query results 1008 is complete, the query results rank modifier 1010 sends refined query results 1012 to the client 1002.

Figure 2:
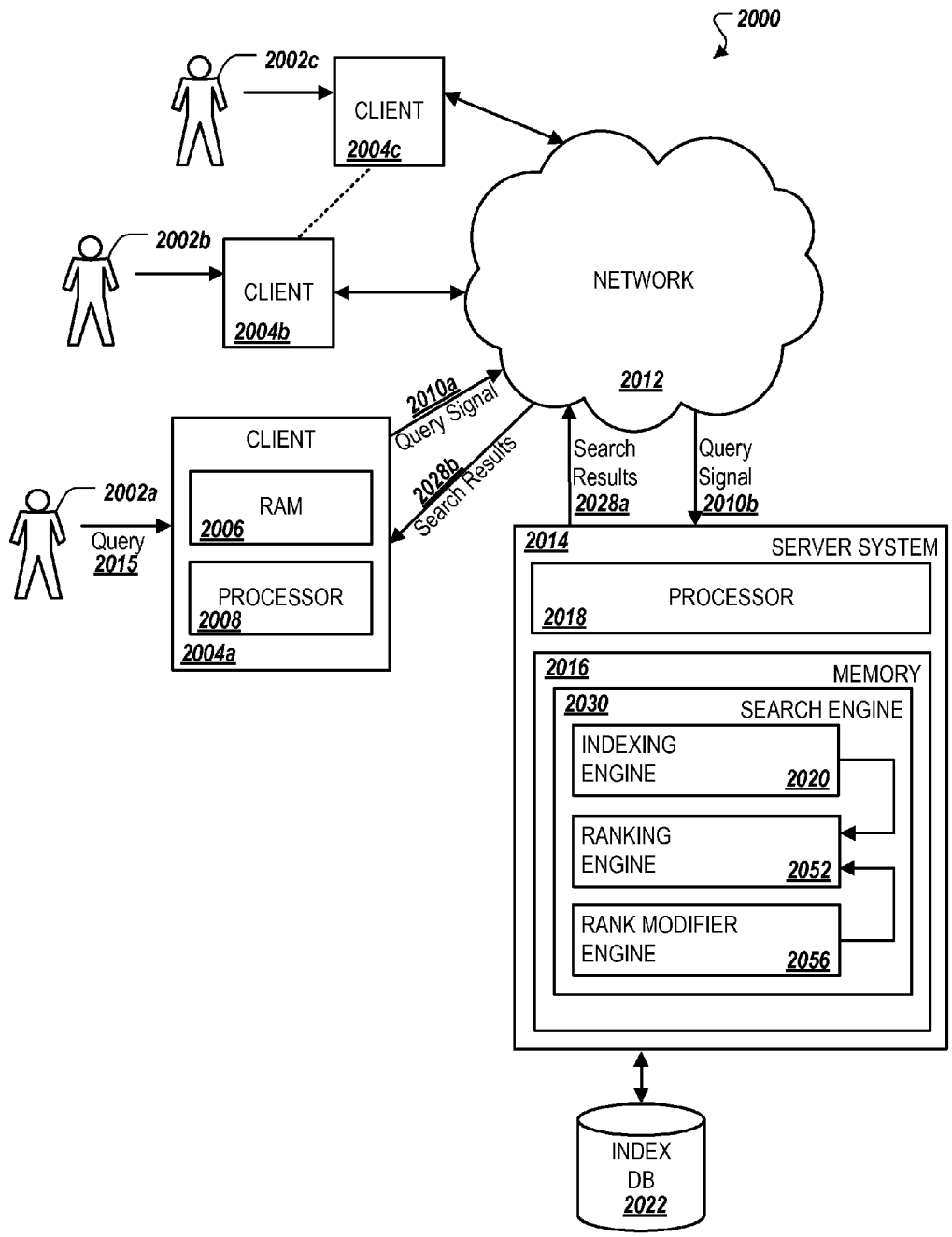
FIG. 2 shows an example information retrieval system in which the relevance of results obtains for submitted search queries can be improved.

FIG. 2 shows an example system 2000 for improving the relevance of results obtained from submitting search queries as can be implemented for the Internet, an intranet, or other client/server environment. The system 2000 is an example of an information retrieval system in which the systems, components and techniques described below can be implemented. Although several components are illustrated, there may be fewer or more components in the system 2000. Moreover, the components can be distributed on one or more computing devices connected by one or more networks or other suitable communication mediums.

A user 2002 (2002a, 2002b, 2002c) can interact with the system 2000 through a client device 2004 (2004a, 2004b, 2004c) or other device. For example, the client device 2004 can be a computer terminal within a local area network (LAN) or wide area network (WAN). In another example, the client device 2004 can be a mobile device (e.g., a mobile phone, a mobile computer, a personal desktop assistant, etc.) that is capable of communicating over a LAN, a WAN, or some other network (e.g., a cellular phone network). The client device 2004 can include a random access memory (RAM) 2006 (or other memory and/or a storage device) and a processor 2008. The processor 2008 is structured to process instructions within the system 2000. In some implementations, the processor 2008 is a single-threaded or multi-threaded processor having one or more processing cores. The processor 2008 is structured to execute instructions stored in the RAM 2006 (or other memory and/or a storage device included with the client device 2004) to display graphical information for a user interface.

A user 2002a can connect to the search engine 2030 within a server system 2014 to submit an input query 2015. When the user 2002a submits the input query 2015 through an input device attached to a client device 2004a, a client-side query signal 2010a is sent into a network 2012 and is forwarded to the server system 2014 as a server-side query signal 2010b.

Server system 2014 can be one or more server devices in one or more locations. A server device 2014 includes a memory device 2016, which can include the search engine 2030 loaded therein. A processor 2018 is structured to process instructions within the device 2014. These instructions can implement one or more components of the search engine 2030. The processor 2018 can be a single-threaded processor or a multi-threaded processor, and can include multiple processing cores. The processor 2018 can process instructions stored in the memory 2016 related to the search engine 2030 and can send information to the client device 2004, through the network 2012, to create a graphical presentation in a user interface of the client device 2004 (e.g., a search results web page displayed in a web browser).

The server-side query signal 2010b is received by the search engine 2030. The search engine 2030 uses the information within the input query 2015 (e.g. query terms) to find relevant documents. The search engine 2030 can include an indexing engine 2020 that actively searches a corpus (e.g., web pages on the Internet) to index the documents found in that corpus, and the index information for the documents in the corpus can be stored in an index database 2022. This index database 2022 can be accessed to identify documents related to the user query 2015. Note that, an electronic document (which for brevity will simply be referred to as a document) does not necessarily correspond to a file. A document can be stored in a portion of a file that holds other documents, in a single file dedicated to the document in question, or in multiple coordinated files. Moreover, a document can be stored in a memory without having first been stored in file.

The search engine 2030 can include a ranking engine 2052 to rank the documents related to the input query 2015. The ranking of the documents can be performed using traditional techniques for determining an IR score for indexed documents in view of a given query. The relevance of a particular document with respect to a particular search term or to other provided information may be determined by any appropriate technique. For example, the general level of back-links to a document that contains matches for a search term may be used to infer a document's relevance. In particular, if a document is linked to (e.g., is the target of a hyperlink) by many other relevant documents (e.g., documents that also contain matches for the search terms), it can be inferred that the target document is particularly relevant. This inference can be made because the authors of the pointing documents presumably point, for the most part, to other documents that are relevant to their audience.

If the pointing documents are in turn the targets of links from other relevant documents, they can be considered more relevant, and the first document can be considered particularly relevant because it is the target of relevant (or even highly relevant) documents. Such a technique may be the determinant of a document's relevance or one of multiple determinants. Appropriate techniques can also be taken to identify and eliminate attempts to cast false votes so as to artificially drive up the relevance of a page.

To further improve such traditional document ranking techniques, the ranking engine 2052 can receive an additional signal from a rank modifier engine 2056 to assist in determining an appropriate ranking for the documents. The rank modifier engine 2056 provides one or more measures of relevance for the documents, which can be used by the ranking engine 2052 to improve the search results' ranking provided to the user 2002. The rank modifier engine 2056 can perform one or more of the operations described above and below in this document to generate the one or more measures of relevance.

For instance, the rank modifier engine 2056 can perform the functionality described above with regard to the query results rank modifier 1010.

The search engine 2030 can forward the final, ranked result list within a server-side search results signal 2028a through the network 2012. Exiting the network 2012, a client-side search results signal 2028b can be received by the client device 2004a where the results can be stored within the RAM 2006 and/or used by the processor 2008 to display the results on an output device for the user 2002a.

Figure 3:
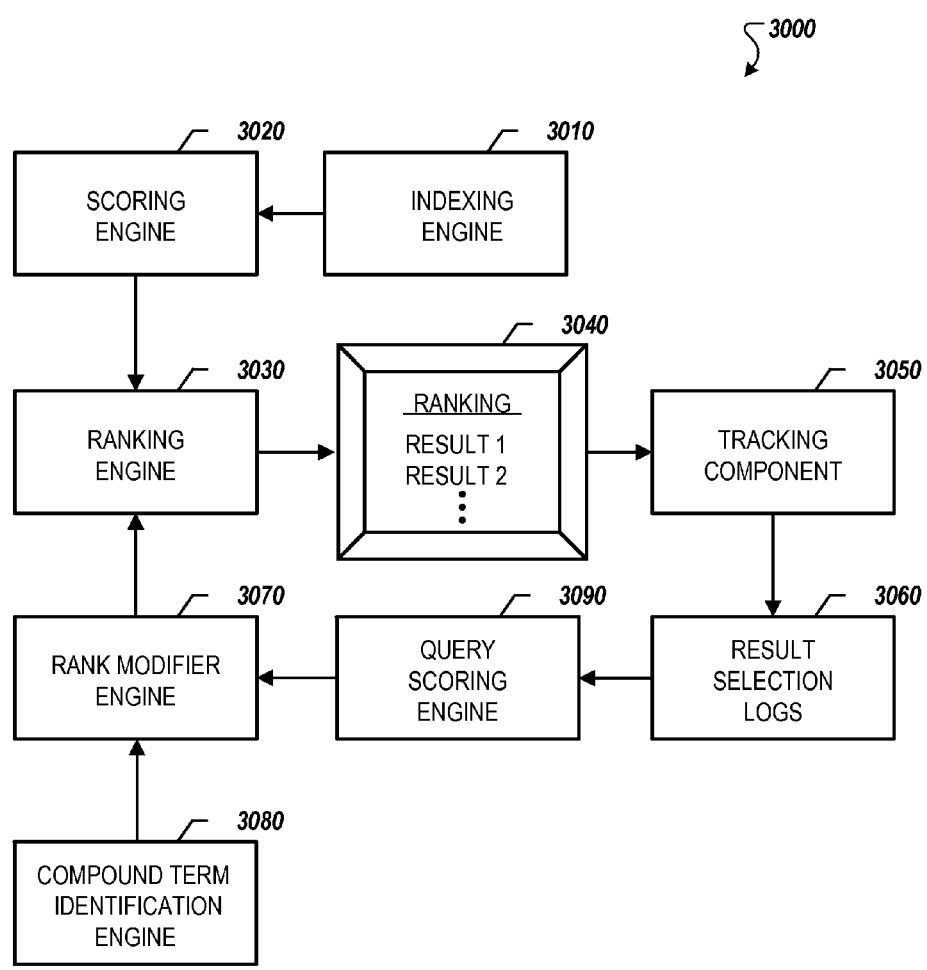
FIG. 3 shows example components of an information retrieval system.

FIG. 3 shows example components of an information retrieval system 3000. These components can include an indexing engine 3010, a scoring engine 3020, a ranking engine 3030, a rank modifier engine 3070, a compound term identification engine 3080, and a query scoring engine 3090. The indexing engine 3010 can function as described above for the indexing engine 2020. The query scoring engine 3090 and the rank modifier engine 3070 can function together as described above with regard to the query results rank modifier 1010. The query scoring engine 3090 can identify similar queries to a user-submitted query. The rank modifier engine 3070 can use the queries identified as being similar to a user-submitted query and associated user behavior data to refine results for the user-submitted query. The compound term identification engine 3080 can identify compound terms (e.g., a collection of two or more terms conveying a concept) contained within a query.

In addition, the scoring engine 3020 can generate scores for document results based on many different features, including content-based features that link a query to document results, and query-independent features that generally indicate the quality of documents results. The content-based features can include aspects of document format, such as query matches to title or anchor text in an HTML (Hyper Text Markup Language) page. The query-independent features can include aspects of document cross-referencing. Moreover, the particular functions used by the scoring engine 3020 can be tuned, to adjust the various feature contributions to the final IR score, using automatic or semi-automatic processes.

The ranking engine 3030 can produce a ranking of document results 3040 for display to a user based on IR scores received from the scoring engine 3020 and one or more signals from the rank modifier engine 3070. A tracking component 3050 can be used to record information regarding user behavior such as individual user selections of the results presented in the ranking 3040. For example, the tracking component 3050 can be embedded JavaScript code included in a web page ranking 3040 that identifies user selections (e.g., mouse clicks) of individual document results and also identifies when the user returns to the results page, thus indicating the amount of time the user spent viewing the selected document result. In other implementations, the tracking component 3050 is proxy system through which user selections of the document results are routed, or the tracking component can include pre-installed software at the client (e.g., a toolbar plug-in to the client's operating system). Other implementations are also possible, such as by using a feature of a web browser that allows a tag/directive to be included in a page, which requests the browser to connect back to the server with message(s) regarding link(s) clicked by the user.

The recorded information can be stored in result selection logs 3060. The recorded information can include log entries that indicate, for each user selection, the query (Q), the document (D), the user's dwell time (T) on the document, the language (L) employed by the user, and the country (C) where the user is likely located (e.g., based on the server used to access the IR system). Other information indicative of user behavior can also be recorded, such as user interactions with a presented ranking, including negative information, such as the fact that a document result was presented to a user, but was not clicked, position(s) of click(s) in the user interface, information about the session (e.g., existence and type of previous clicks, and post-click session activity), IR scores of clicked results, IR scores of all results shown before click, the titles and snippets shown to the user before the click, the user's cookie, cookie age, IP (Internet Protocol) address, user agent of the browser, etc.

In various implementations, the time (T), also known as "click data", is measured as the time between the initial click through to the document result until the time the user comes back to the main page and clicks on another document result. In general, an assessment is made about the time (T) regarding whether this time indicates a longer view of the document result or a shorter view of the document result, since longer views are generally indicative of quality or relevance for the clicked through result. This assessment about the time (T) can further be made in conjunction with various weighting techniques.

The compound term identification engine 3080 can identify compound terms within a query and provide such identifications to the rank modifier engine 3070 for use in modifying the rank of search results. As described above, a compound term can be a collection of two or more terms that convey a concept. For example, in the query "new york restaurants," the "new york" portion can be identified as a compound term. The compound term identification module 3080 can identify compound terms based upon a variety of factors, such as the presence of query terms in a compound term corpus (e.g., lexicon, search log, documents, etc.), user behavior with regard to previously identified compound terms, the context within which potential compound terms occur in a query, etc.

The compound term identification engine 3080 can provide a confidence score with identified compounds that indicates a likelihood that the collection of terms identified as the compound was intended as such by the user submitting the query. The confidence score can be provided along any range of scores, such as between 0.0 (lowest confidence score) and 1.0 (highest confidence score). For example, using the query "new york restaurants" above, the compound term "new york" can be identified with a 0.9 confidence score (indicating that it is highly likely this collection of terms conveys a concept).

As described with more detail with regard to example technique 6000 below, the rank modifier engine 3070 can use compound identification provided by the compound term identification engine 3080 to adjust match scores based upon whether compound terms in an input query are present in a historical query. The rank modifier engine 3070 and the compound term identification engine 3080 can be separate or part of the same system.

The components shown in FIG. 3 can be combined in various manners and implemented in various system configurations. For example, the scoring engine 3020 and the ranking engine 3030 can be merged into a single ranking engine, such as the ranking engine 2052 of FIG. 2. The rank modifier engine 3070, the query scoring engine 3090, and the ranking engine 3030 can also be merged, and in general, a ranking engine includes any software component that generates a ranking of document results after a query. Moreover, a ranking engine can be included in a client system in addition to (or rather than) in a server system.

Figure 4:
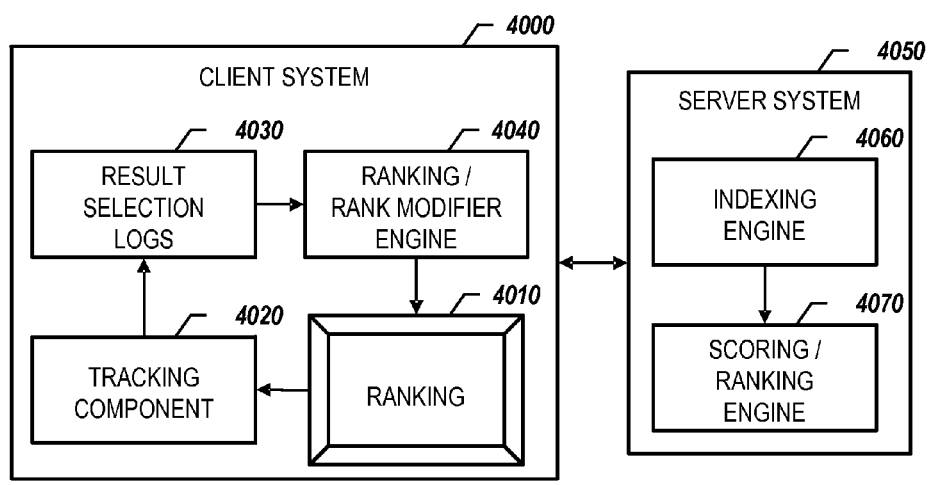
FIG. 4 shows another example information retrieval system.

FIG. 4 shows another example information retrieval system. In this system, a server system 4050 includes an indexing engine 4060 and a scoring/ranking engine 4070. A client system 4000 includes a user interface for presenting a ranking 4010, a tracking component 4020, result selection logs 4030 and a ranking/rank modifier engine 4040. The ranking/rank modifier engine 4040 can perform at least some of the functionality described above with regard to the query results rank modifier 1010. For example, the client system 4000 can include a company's enterprise network and personal computers, in which a browser plug-in incorporates the ranking/rank modifier engine 4040. When an employee in the company initiates a search on the server system 4050, the scoring/ranking engine 4070 can return the search results along with either an initial ranking or the actual IR scores for the results. The browser plug-in can then re-rank the results locally based on tracked page selections for the company-specific user base.

Figure 5:
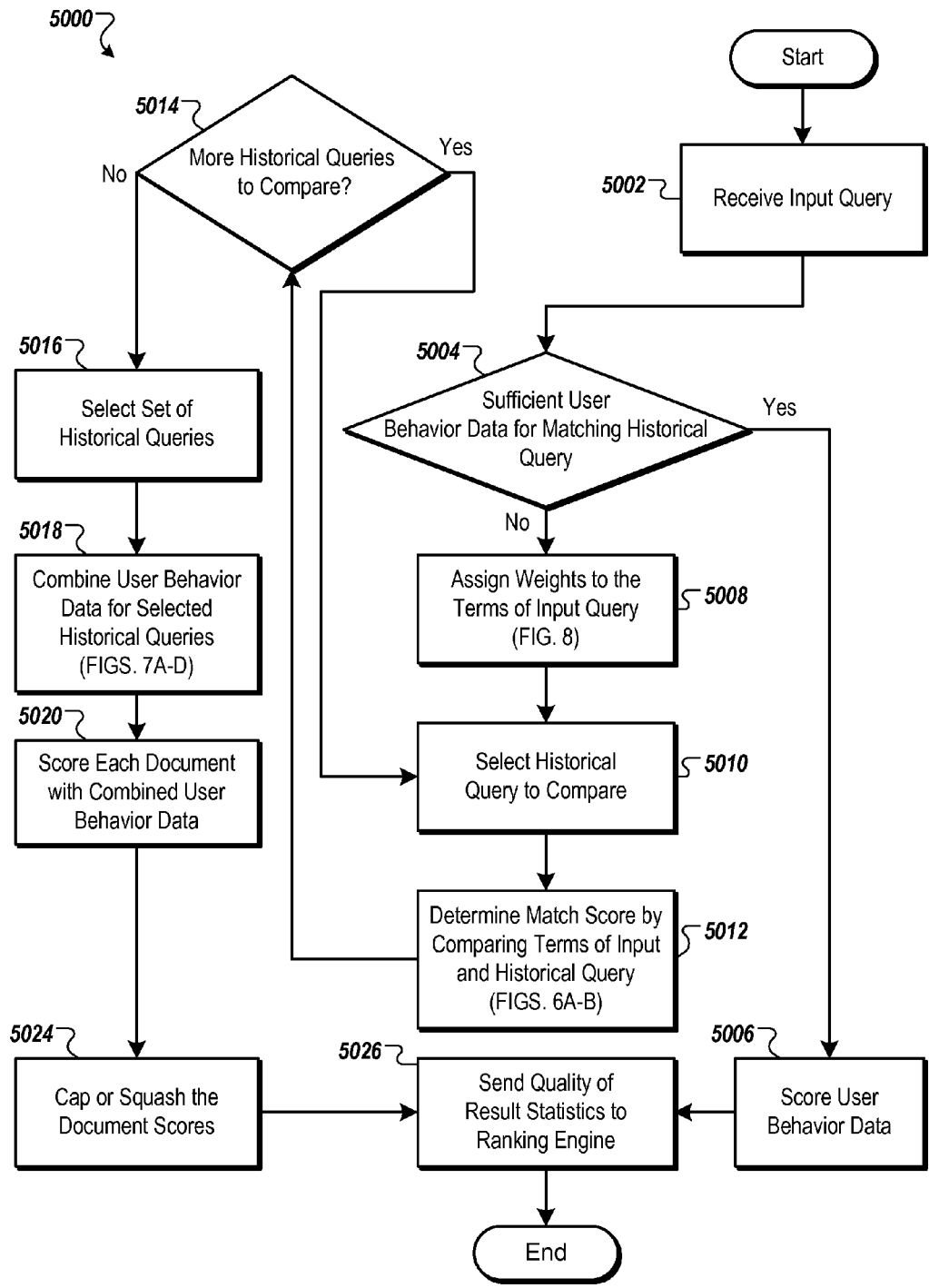
FIG. 5 is a flow chart describing an example technique of identifying and borrowing user behavior data from historical queries that are similar to an input query.

FIG. 5 is a flow chart describing an example technique 5000 for identifying and borrowing user behavior data from historical queries that are similar to an input query. The technique 5000 can be performed by a variety of systems, for example, by the server system 2014 and its rank modifier engine 2056, as described with reference to FIG. 2, or by the information retrieval system 3000 and its rank modifier engine 3070 and query scoring engine 3090, as described with reference to FIG. 3.

For purposes of illustration, the technique 5000 is described in two parts. The first part concerns determining the similarity between historical queries and the input query. The purpose of the first part is to have a measure by which the historical queries can be compared, so that the user behavior data can be borrowed from the most similar historical queries. The second part concerns combining and refining the user behavior data from a selection of the historical queries. The first part of technique 5000 covers steps 5008-5014 and the second part of technique 5000 covers steps 5016-5024, as are described below in further detail.

The technique 5000 begins at step 5002 by receiving an input query. As described above with regard to FIG. 1, the input query can be submitted over a variety of environments (e.g., Internet, intranet, local machine). For example, the user 2002a can submit the input query 2015 over the network 2012 using client 2004a.

After receiving the input query, it is determined whether there is a historical query identical to the input query ("the identical historical query") with sufficient user behavior data (step 5004). Sufficiency can be required in order to not give too much weight to the behavior data gathered from any groups or individual users. Sufficiency of user behavior data for a historical query can be determined in a variety of ways. In some implementations, sufficiency is based on the number of distinct users from which the user behavior data has been obtained. In some implementations, sufficiency is based on the amount of user behavior data. In some implementations, the sufficiency of user behavior data is based on statistical analysis of the user behavior data (e.g., regression toward the mean analysis). The sufficiency of user behavior data can be judged in the aggregate or for a period of time (e.g., the past year, the past month). In some implementations, the sufficiency of user behavior data is based on a classification of the historical query (e.g., consumer goods, web pages, news, etc.).

For example, a historical query having no associated user behavior data (e.g., no data has been collected from users submitting the historical query) will likely be identified as having insufficient user behavior data. Similarly, a historical query associated with user behavior data collected from 10,000 users can be identified as having insufficient user behavior data. The threshold between sufficient and insufficient user behavior data can vary over time and can be determined in a variety of manners, as described in the previous paragraph.

If there is sufficient user behavior data for the identical historical query, then each document is scored with the user behavior data associated with the identical historical query (step 5006). Scoring derives a quality of result statistic for each document for which there is user behavior data associated with the identical historical query. A quality of result statistic can be a statistic that provides an indication of a document's relevance with regard to a particular query. For example, as provided above with regard to FIG. 1, a weighted average of the count of long clicks for a given document and query. Once scoring is completed, the quality of result statistics are sent to a ranking engine (such as ranking engine 3030; step 5026).

In some implementations, step 5004 is performed for each document contained within a set of query results received from a search engine (e.g., the query results 1008 from the search engine 1006). In such implementations, a determination is made as to whether the identical historical query has a sufficient amount of associated user behavior data for each document in the query results received from the search engine. Referring to FIG. 1 as an example, a determination is made as to whether there is a sufficient amount of user behavior data is associated with the input query 1004 for document A from the query results 1008. The same determination would then be made for the other documents B-F from the query results 1008.

In such implementations, if there is sufficient user behavior data for a document, then the document is scored with the user behavior data associated with the identical historical query (step 5006). In such implementations, user behavior data associated with the identical historical query is used on a per document basis. Referring to FIG. 1 as an example again, if it is determined that there is a sufficient amount of user behavior data associated with documents A-C but there is an insufficient amount of user behavior data associated with documents D-F, then step 5006 (apply user behavior data from the identical historical query) will be performed for documents A-C and steps 5008-5026 (identifying and borrowing user behavior data from similar historical queries) will be performed for documents D-F.

In some implementations, technique 5000 proceeds to step 5008 even if it is determined at step 5004 that there is a sufficient amount of user behavior data associated with the identical historical query (either for each document contained in a search engine query results or for the identical historical query as a whole). In such implementations, user behavior data from the identical historical query is combined with user behavior data from similar historical queries, as described below. Such a combination may be performed for a variety of reasons, including user behavior data for the identical historical query lacking the amount of user behavior data of similar historical queries.

If there is not sufficient data for the identical historical query (or as described in the previous paragraph), then the technique of identifying historical queries that are similar to the input query, described above as the first part of technique 5000, begins at step 5008. To determine the similarity between the input query and a historical query, the terms of the input query are compared to the historical query. A tally for the historical query is incremented or multiplied, depending on the scoring technique used, by the weight of each term in the input query that matches a term in the historical query. The weights can reflect the degree of similarity between the terms and the type of term being matched. The weights can range between 0.0 and 1.0, where 0.0 indicates no match and 1.0 indicates an exact match of a regular term, for example. Once all of the term weights are determined, they can be combined in a variety of ways (further described below) to create a match score for a historical query. The match score can be used as the basis by which historical queries are selected for the purpose of borrowing user behavior data for the input query.

At step 5008, the first part of technique 5000 begins by assigning weights to the terms of the input query. Each term of the input query is assigned a weight according to its type. The types of terms that can exist in the input query are regular terms, variant terms, optional terms, and stopword terms. Each of these terms is described below with reference to the example input query "official jack in the box" (the input query 1004 in FIG. 1). An example technique for assigning weights to the terms of an input query is described below with reference to FIG. 8.

Regular terms are terms that are important or necessary within the context of the input query. A regular term in the example input query is "jack". Regular terms in a can be assigned a weight indicative of importance, such as 1.0.

Variant terms are terms that are important or necessary within the context of the input query. Unlike a regular term, a variant term can be substituted by one or more variants of the variant term. Variants can be stems, synonyms, or diacritical variants of the variant term. For example, a variant term from the example input query is "box" and variants can be "boxes" (a stem), "crate" (a synonym), or "böx" (a diacritical variant). A variant term can receive a weight indicative of importance, such as 1.0. A variant of a variant term can receive a weight that is indicative its similarity to the variant term within the context of the input query. The weight for the variant term can be within a range, such as 0.4-1.0, 0.4-0.9, 0.4-0.8, 0.4-0.7, 0.5-1.0, 0.5-0.9, 0.5-0.8, 0.5-0.7, 0.6-1.0, 0.6-0.9, 0.6-0.8, or 0.6-0.7.

When assigning a weight to a variant term, variants can be determined and added to the input query. Additionally, variants added to the input query can be assigned a weight, as described in the previous paragraph, and can be considered in comparing a historical query to the input query when the variant term does not match.

Optional terms are terms that are not regarded as being necessary or having a high degree of importance within the context of an input query. An optional term in the example input query is "official." Since optional terms are, as the name suggest, optional, they can be assigned a weight indicative of less importance than a regular term and a variant term. For example, if the weight of a regular term is 1.0, then the weight of optional terms can be less than 1.0, such as 0.25, 0.4, 0.5, 0.6, or 0.75.

Stopword terms include articles, conjunctions, prepositions, and pronouns. Stopword terms in the example input query are "in" and "the." Stopword terms can be assigned a weight indicative of less importance than regular terms and optional terms. For example, if the weight of regular terms is 1.0 and the weight of optional terms is 0.4, then the weight of stopword terms can be a weight less than 0.4, such as 0.05, 0.10, 0.20, or 0.25.

TABLE 1 below illustrates the assignment of weights to the terms the example input query in some implementations. For illustrative purposes, weights of 1.0, 1.0, 0.3, and 0.1 are assigned to regular terms, variant terms, optional terms, and stopword terms, respectively. Furthermore, in this example variants can receive weights within the range 1.0-0.6. The sum of the term weights for the example input query (without including the weights for variants of a variant term) can serve as the maximum weight for a historical query. A historical query could receive the maximum weight if it matched all of the terms of the input query exactly.

TABLE 1

| TERM | TERM TYPE | WEIGHT |
|------|-----------|--------|
| "official" | Optional term | 0.6 |
| "jack" | Regular term | 1.0 |
| "in" | Stopword term | 0.2 |
| "the" | Stopword term | 0.2 |
| "box" | Variant term | 1.0 |
| "boxes" | Variant of "box" | 0.9 |
| "crate" | Variant of "box" | 0.6 |
| "bŏx" | Variant of "box" | 0.7 |
| MAX. WEIGHT FOR HISTORICAL QUERY | | 3.0 |

Once weights have been assigned to the terms of the input query, a historical query is selected to compare to the input query (step 5010). The historical query can be selected from a set of historical queries. In some implementations, the set of historical queries is determined by generalizing the input query. Generalizing the input query can involve removing optional and stopword terms and substituting variants for the variant terms. In such implementations, the set of potential queries includes all queries that can be derived by generalizing the input query. In some implementations, the set of historical queries includes all historical queries stored in a repository of historical queries. In some implementations, the set of historical queries includes historical queries that have been designated as pertaining to a general topic of the input query.

With a historical query selected for comparison, the selected historical query is compared to the input query (step 5012). Based upon this comparison, a match score is determined for the selected historical query. Step 5012 is depicted and described in greater detail with regard to FIGS. 6A-C. Generally, step 5012 involves comparing each term of the input query against the selected historical query. If an exact match of a term is found, then a tally (or tallies) is adjusted by the weight assigned to input query term in step 5002. If an exact match of a regular term is not found, then the historical query can be removed from consideration as being similar to an input query. If an exact match of an original variant term is not found, then variants of the original variant term can be considered. If a term in the selected historical query is found to be a variant of the original variant term from the input query, then the tally (or tallies) is adjusted by a weight for the variant. The weight for a variant term falls within a range, which generally extends from the weight of an optional term to the weight of a regular term. The weight for a variant depends on a degree of similarity between the variant term in the selected historical query and the regular term in the input query (e.g., variant terms that are more similar to the input query term will have a greater weight than variant terms that are less similar).

Once all of the terms of the input query have been compared against the selected historical query, various adjustments can be made to the weight tally (or tallies). For instance, the weight tally (or tallies) can be decreased if it is determined that the terms of the historical query are out of order with respect to the input query. In another example, the match score for a historical query can be decreased if the match changes a compound term (e.g., after substituting variants, compound term "fat duck" could change to "fat goose"). Once the various adjustments are made, then a match score is determined for the selected historical query based upon the weight tally (or tallies). A variety of techniques can be used for determining a match score, as described below with regard to FIGS. 6A-C.

After determining the match score for the selected historical query, a determination is made as to whether there are more historical queries to compare to the input query (step 5014). This determination is made based upon the set of historical queries discussed above with regard to step 5010. In some implementations, each historical query within the defined set of historical queries is compared. In some implementations, comparison is performed on queries within the set until a desired number of historical queries with a match score above a threshold value are found. At step 5014, if there are more historical queries to compare, then step 5010 is repeated and another historical query is selected for comparison to the input query.

If there are no further historical queries to compare, then the process of combining and refining the user behavior data from a selection of historical queries begins (step 5016), described above as the second part of the technique 5000. The second part involves selecting a historical query or a group of historical queries from which user behavior data will be borrowed. This selection can be based on the match scores determined in step 5012 and described in more detail with regard to FIGS. 6A-C. The user behavior data associated with the selected historical queries is then combined. This combination can be done in a variety of ways, as described in detail with regard to FIGS. 7A-D. The combined user behavior data for each document can then be scored. Scoring derives a quality of result statistic (described above) for each document. Before the scores are sent to the ranking engine, they can be refined by a variety of techniques, such as capping or squashing scores associated with various document.

At step 5016, one or more of the historical queries is selected based on the match scores computed at step 5012. User behavior data associated with the selected one or more of the historical queries are borrowed for the input query. A variety of techniques to select the historical query or queries can be used. In some implementations, a fixed number of historical queries can be selected (e.g., the historical queries having the top 2, 3, 4, 5, 10, 15, 20, 50, 100 match scores). In some implementations, the historical queries with a match score above a threshold can be selected (e.g., select historical queries with a minimum amount of similarity to the input query). In some implementations, the historical queries with match scores in a certain percentile range can be selected (e.g., select the historical queries in the top 0.1%, 0.5%, 1%, 3%, 5%, 10% of match scores). In some implementations, the historical queries are selected on an as-needed basis until a sufficient amount of user behavior data has been obtained (e.g., select queries one at a time in order of descending match score until a threshold amount of user behavior data has been obtained).

Next, the user behavior data from the selected historical queries is combined (step S018). The user behavior data is combined per document. For example, as described above with regard to the combined user behavior data table 1026, the user behavior data 1018*a* for document C that is associated with historical query 1020*a* is combined with the user behavior data 1018*b* for document C that is associated with historical query 1020*b*. Various techniques for combining the user behavior data can be employed, as described with reference to FIGS. 7A-D. Some techniques involve weighting the user behavior data by the similarity of the historical query with which it is associated. Some techniques include aggregating the user behavior data without weights. Some techniques limit the contribution of user behavior data associated with a single historical query. Some techniques permit the contribution of user behavior data without weights until a sufficient amount has been received. Some techniques permit the user behavior data associated with the historical query having the top match score to receive a boost relative to the user behavior data associated with the other selected historical queries.

After combining the user behavior data, each document is scored using the combined user behavior data (step 5020). The documents that can be scored include the documents for which there is associated combined user behavior data. As described above with regard to step 5006, scoring derives a quality of result statistic for each document. The quality of result statistic can provide an indication of the document's relevance to the input query and can be used to rank documents for the purpose of providing query results to a client.

The scoring from step 5020 can be refined by capping and squashing the quality of result statistics for various documents (step 5024). Capping means the quality of result statistic is limited to a maximum value. Among a variety of reasons, capping can be performed to mitigate the risk of potential false matches. Capping can be performed on the quality of result statistic for each document. The cap limit can be determined from a variety of techniques. In some implementations, the cap limit is a fixed value that can be derived from empirical tests. In some implementations, the cap limit is a determined value based on a statistical distribution of the quality of result statistics. In some implementations, the cap limit is a determined value based on the match scores for the selected historical queries. In some implementations, the cap limit is used when one of the selected historical queries is determined to be a "risky" match.

Squashing can be performed to increase or decrease a document's quality of result statistic based upon a comparison between the document and the input query. It is possible that the matching of historical queries to the input query and the combining of user behavior data associated with various historical queries will occasionally yield quality of result statistics that are skewed. Squashing can attempt to correct any skewed quality of result statistics that may be produced by comparing the input query to the content of the document. A variety of cases can invoke squashing and a variety of squashing techniques can be used. For example, if a document with a quality of result statistic above a certain level does not have support within the document for an optional term, the quality of result statistic can be decreased. The amount by which the quality of result statistic can be increased or decreased by squashing can vary. In some implementations, the amount is a percentage of a quality of result statistic. In some implementations, the amount is a predetermined amount or a dynamically determined amount. In some implementations, the amount is determined based on the quality of result statistic for similar documents (e.g., other documents without support for an optional term) without a skewed quality of result statistic.

In another example, squashing can be applied when a variant that has been used to match an input query to a historical query. Applications of squashing in such a situation can occur for a variety of reasons, such as, the variant not having support within the document or the variant frustrating the meaning of the input query. For instance, using user behavior data from the historical query "Asia food" can provide disproportionate quality of result statistics for the input query "Asian food" because the compound term "Asian food" has a different meaning than "Asia food."

After the quality of result statistics for the documents have been refined in step 5024, the refined quality of result statistics are sent to a ranking engine (step 5026). The ranking engine can perform document ranking for an input query based upon, at least, the IR score and the quality of result statistic for each document. The ranking engine can be, for example, the ranking engine 2052 described with reference to FIG. 2 or the ranking engine 3030 described with reference to FIG. 3.

Figure 6A:
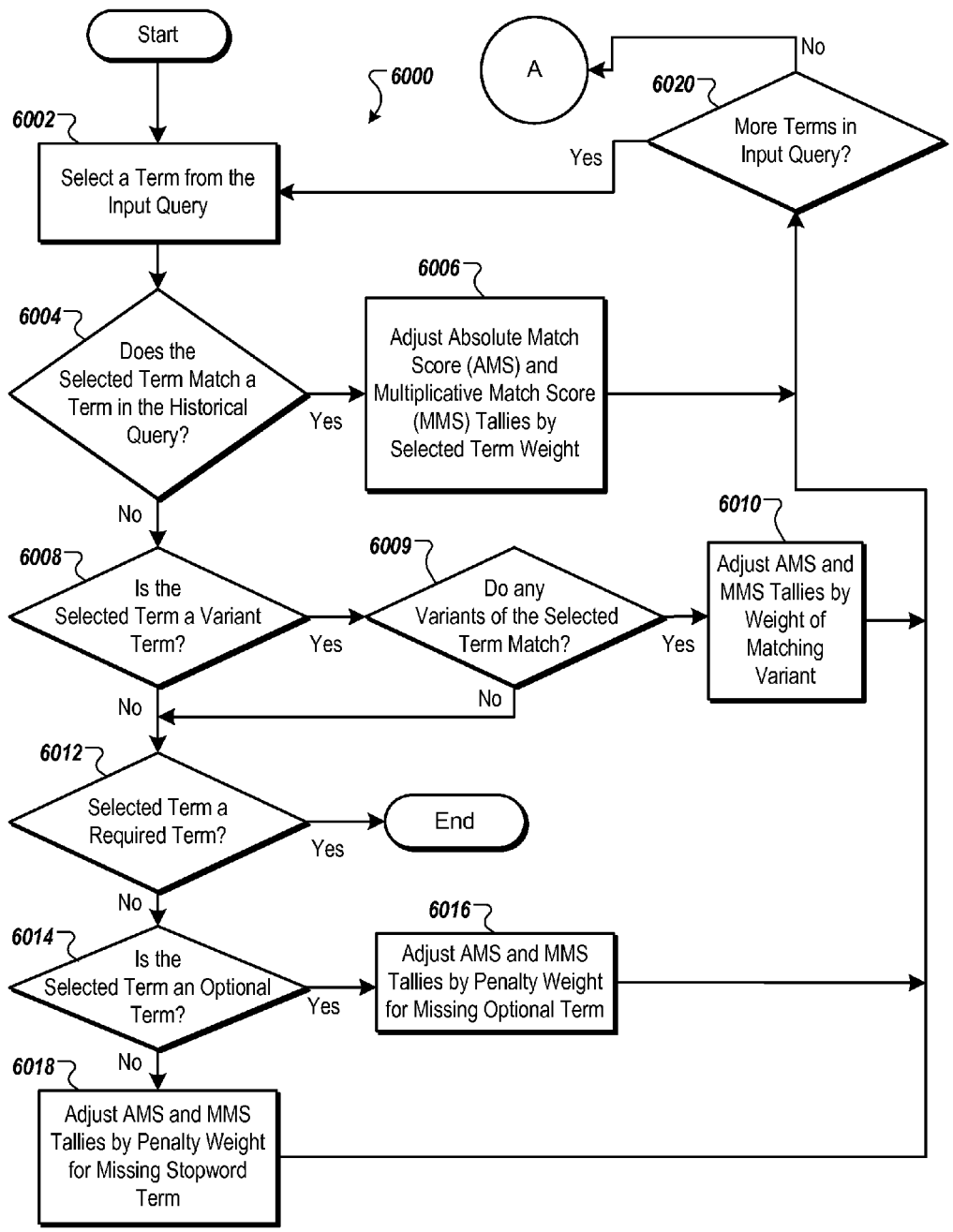
FIGS. 6A-C are flow charts describing an example technique of determining a similarity between terms of an input query and terms of a historical query.
Figure 6B:
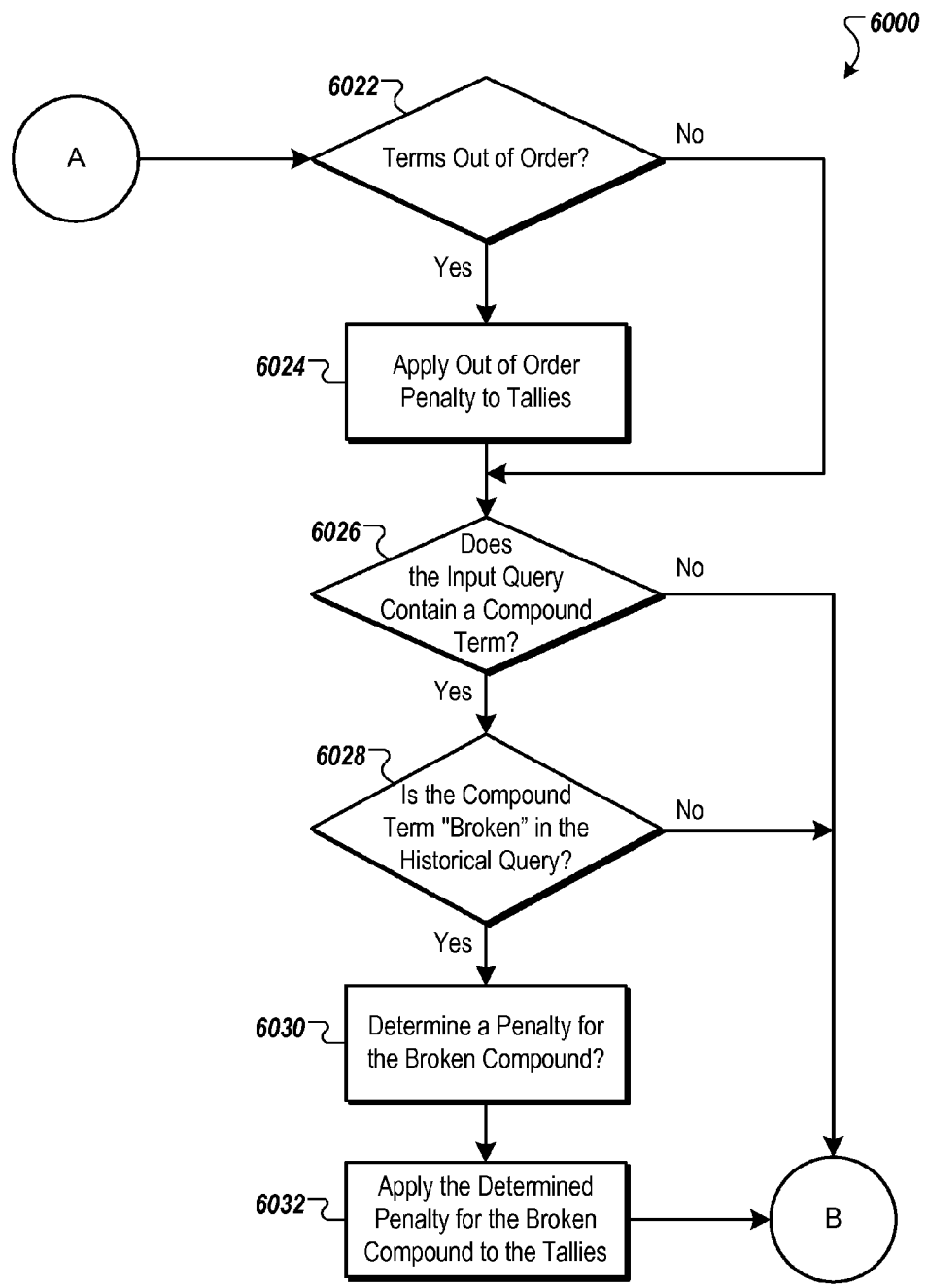
Figure 6C:
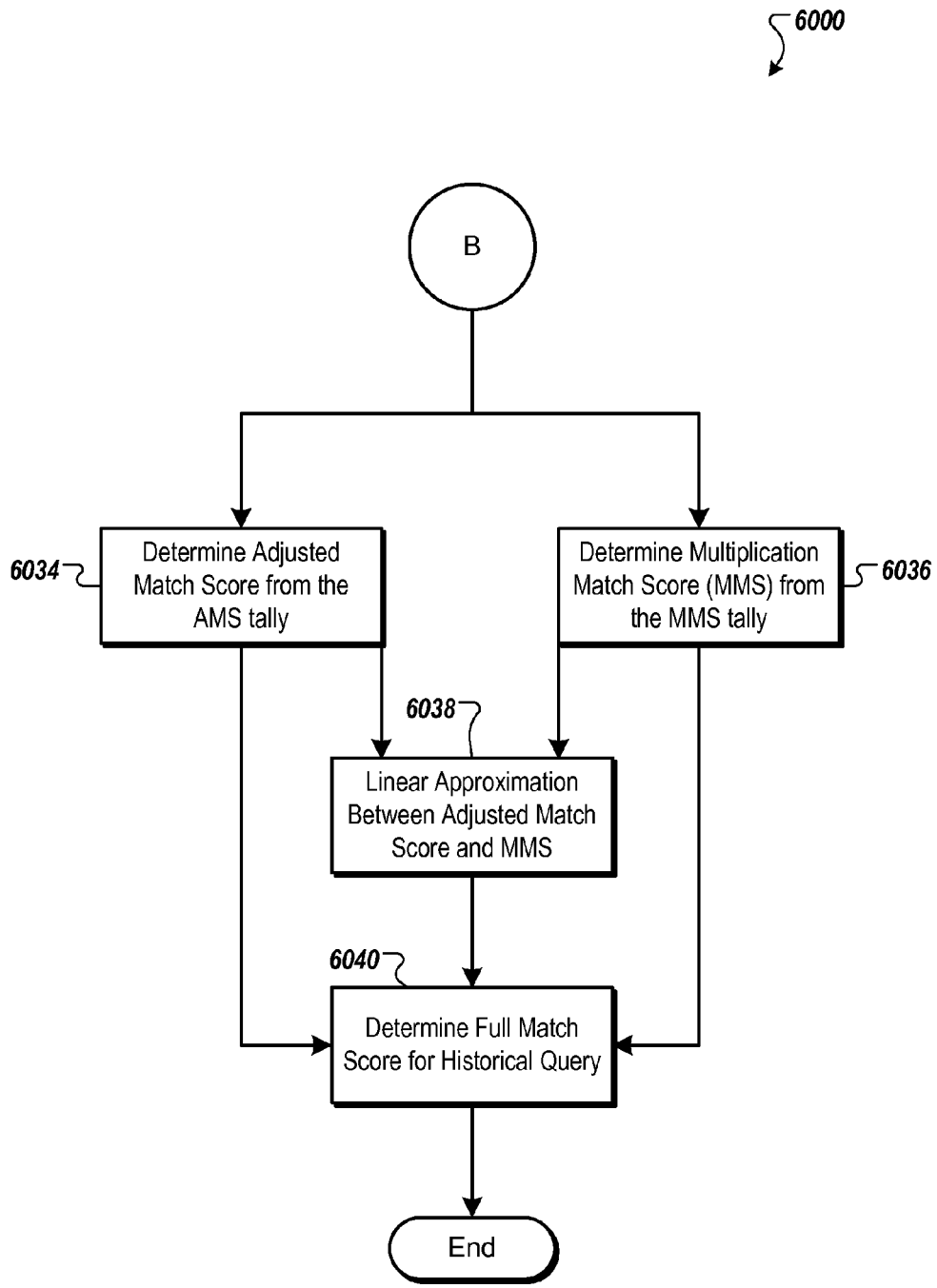

FIGS. 6A-C are flow charts describing an example technique 6000 of determining a similarity between terms of an input query and terms of a historical query. The technique 6000 can be performed by a variety of systems, for example, by the server system 2014 and its rank modifier engine 2056, as described with reference to FIG. 2, or by the information retrieval system 3000 and its query scoring engine 3090, as described with reference to FIG. 3. The technique 6000 can be performed as part of technique 5000 from FIG. 5. For example, the technique 6000 can be performed at step 5012.

The similarity between the input query and the historical query can be represented by a match score, as described above. By way of illustration, the match score is determined in two parts. The first part pertains to determining which of the terms from the input query match (exactly or as a variant) a term in the historical query. For each term that is found to match, a weight for the match is determined based upon the degree of similarity between the two terms. The second part pertains to determining a match score for the historical query from the weights for each matching term. The first part covers steps 6002-6020. The second part covers steps 6022-6040.

Beginning at step 6002, a term from the input query is selected for comparison to the historical query. For example, if the input query "official pinewood derby car kit" is being compared to the historical query "fast pinewood derby cars," one of the terms from the input query (e.g., "pinewood") is selected for comparison to the historical query.

The steps 6004, 6008, and 6009 determine whether the selected term from the input query matches (exactly or as a variant) a term in the historical query. The steps 6006, 6010, 6016, and 6018 determine a weight for the matched term and combine the determined weight into a tally. A single tally or multiple tallies can be used to track the weight of matching terms. For instance, in the example technique 6000, two tallies are used. The first tally is an absolute match score (AMS) tally, which aggregates the determined weight for all matched terms (e.g., a determined weight is added to the AMS tally). The second tally is an multiplicative match score (MMS) tally, which is the product of the determined weights for all matched terms (e.g., a determined weight is multiplied to the MMS tally). Other tallies are possible.

At step 6004, a determination is made as to whether the selected term from the input query exactly matches a term in the historical query. An exact match can be determined regardless of the type of term (e.g., regular term, variant term, optional term, stopword term, etc.) that is selected from the input query. If an exact match is found, then a weight for the matching term is determined and the tallies are adjusted accordingly (step 6006). For an exact match, the determined weight of the matching term can be the weight that was assigned to the selected term from the input query. As described above with reference to step 5008 in FIG. 5, each term from the input query is assigned a weight according to its term type. This weight assigned to the selected term of the input query can be used to adjust the AMS and MMS tallies.

For instance, if the term "pinewood" is selected from the input query "official pinewood derby car kit" and compared against the historical query "fast pinewood derby cars," an exact match will be found ("pinewood" appears in both the input and historical query). Since an exact match is found, the AMS and MMS tallies will be adjusted by the weight assigned to the term "pinewood" in the input query. For example, if the term "pinewood" in the input query has been assigned a weight of 1.0 for regular terms, then the AMS is incremented by 1.0 and the MMS tally is multiplied by 1.0.

In some implementations, the weight for a matching term is determined to be lower than the weight assigned to the input query term if there is a reason to doubt the quality of the match (e.g., a "risky" or "potentially false" match). For example, if the optional term "official" from the input query "official pinewood derby car kit" were determined to be an exact match to a term in the historical query "pinewood derby race official," there could be doubt regarding the match. The term "official" is used in the input query as an adjective but its use in the historical query is unclear—it could either be used as an adjective (e.g., an "official pinewood derby race") or as a noun (e.g., an "official" who officiates a "pinewood derby race"). In another example, the historical query "new restaurant York" can match the input query "New York restaurant." However, this historical query match can be termed a risky match because it connotes a different meaning. Furthermore, the compound "New York" from the input query is not present in the matched historical query.

In order to account for the uncertainty of the match, the weight by which the AMS and MMS tallies are adjusted (e.g., the weight assigned to the term "official" from the input query could be decreased) in some implementations. For instance, if the weight assigned to the term "official" is 0.6 (an example weight for an optional term), the weight by which the AMS and MMS tallies are adjusted could be 0.2.

In some implementations, the weight for a potentially false match is a dynamically determined value or a predetermined value, such as 0.05, 0.1, 0.15, 0.2, 0.3, 0.4, 0.5, or 0.75. In some implementations, the weight for a potentially false match is a percentage of the weight of the input query that is being matched, such as 1%, 5%, 10%, 25%, 30%, 50%, or 75%, for instance. The percentage used can be based on a determined degree of doubt regarding the match. Potentially false matches can be determined for all types of input query terms (e.g., regular terms, optional terms, stopword terms, etc.).

At step 6008, a determination is made as to whether the selected term from the input query is a variant term. Step 6008 can be performed if an exact match was not determined at step 6004. If a variant term did not match a term in the historical query, then variants of the variant term can be considered at step 6009. As described above, a variant can be a synonym or a stem of another term. Determining whether a term is a synonym can involve referring to a database storing synonym relationships among various query terms. Determining whether a term is a stem can involve doing a character comparison of the two terms. For example, the term "car" can be a synonym of the term "auto" and a stem of the term "cars."

If a term in the selected term from the input query is found to be a variant term, then a determination can be made as to whether any of the variants of the variant term match a term in the historical query (step 6009). As described above, variants of variant terms are determined and assigned a weight when weights for the terms of the input query are assigned. For instance, the variant term "car" can have variants "auto" and "cart" with weights of 0.9 and 0.6, respectively. At step 6009, a determination is made as to whether "auto" or "cart" (variants) match a term in the historical query.

If a variant is found to match a term in the historical query, then a weight for the variant match can be determined and used to adjust the AMS and MMS tallies (step 6010). Variants of variant terms in the input query can be assigned weights that depend on a degree of similarity to the variant term. A variant term that is more similar will have a greater weight than a term that is less similar. For instance, of two terms "auto" and "cart" that are variants of the query term "car" ("auto" is a synonym and "cart" is a stem), the term "auto" will likely have a greater weight because it is more similar than "cart."

In some implementations, the degree of similarity for a variant is dynamically determined or predetermined. Obtaining a degree of similarity in such implementations can include referring a database that maintains the predetermined degree of similarities. In some implementations, the degree of similarity for a variant can be determined, at least in part, by the context within which the variant term appears. For instance, the term "cart" can have an increased degree of similarity to the input query term "car" if the input query also contains the term "golf" (e.g., it is more likely that "car" refers to "cart" when the word "golf" is present (referring to a "golf cart") than when it is not present).

Weights for variants can be restricted to a weight range. The weight range can depend on the type of term from the input query that is being matched. For example, a weight range for a variant can be between the weight of optional terms and the weight of variant terms. If the weight of variant terms is 1.0 and the weight of optional terms is 0.4, the weight for a variant of a regular term can be in a range such as 0.4-1.0, 0.4-0.9, 0.4-0.8, 0.4-0.7, 0.5-1.0, 0.5-0.9, 0.5-0.8, 0.5-0.7, 0.6-1.0, 0.6-0.9, 0.6-0.8, or 0.6-0.7.

The weight for a variant can additionally be decreased if the match is determined to be potentially false, as described above. For instance, an aggressive synonym that is found to match a term from the input query can be a potentially false match. An aggressive synonym can be a synonym that asserts a synonym relationship between two terms even though the synonym relationship may not exist within all contexts. For example, the terms "parts," "stage," and "newspaper" can be identified as aggressive synonyms for the input query terms "tire," "staging," and "new papers," respectively.

Once the weight for the variant is determined, a tally for the determined weights can be adjusted. For instance, using the example AMS and MMS tallies, if the variant "auto" is determined to be a synonym of the variant term "car" with a weight of 0.7, then the AMS tally can be incremented by 0.7 and the MMS tally can be multiplied by 0.7. If the selected input term is determined to not be a variant term (step 6008) or is determined to not have any variants that match the historical query (step 6009), then a determination can be made as to whether the selected term is a required term (6012). If a required term is not found to match a term in the historical query, then the historical query can be ruled-out from contributing user behavior data to the input query and the technique 6000 can end. In some implementations, required terms are all regular terms and variant terms in the input query. In further implementations, required terms include any terms (including optional and stopword terms) enclosed in quotations with a regular or variant term in the input query. In some implementations, required terms (including optional and stopword terms) are any terms joined by a logical conjunction operator (e.g., "banana and orange").

If the selected term is not a required term, then a determination can be made as to whether the selected term is an optional term (step 6014). If the selected term is an optional term, then the AMS and MMS tallies can be adjusted by penalty weight for the missing optional term. In some implementations, the AMS tally is not adjusted by a penalty weight because, by not incrementing the AMS tally by the weight of the optional term, the AMS tally is implicitly penalized.

If the selected term is not a required term, then a determination can be made as to whether the selected term is an optional term (step 6014). If the selected term is an optional term, then a penalty can be applied to the MMS tally and possibly to the AMS tally (step 6014). The penalty is applied because the optional term was not found to be present in the historical query. The penalty can be based upon the weight of the selected term. In some implementations, the penalty is a percentage of the weight of the selected term, such as 20%, 30%, 50%, or 75% (e.g., with an optional selected term having an assigned of 0.6, the penalty weight multiplied to the MMS tally could be 0.3 (50% of 0.6)). In some implementations, the penalty is equal to 1.0 minus the weight of the selected term (e.g., for a selected term with a weight of 0.6, the penalty weight could be 0.4 (1.0-0.6)). In some implementations, the penalty is a predetermined weight, such as 0.1, 0.2, 0.5, 0.75, or 0.9.

A penalty weight is generally not applied to the AMS tally because there is an implicit penalty in the amount of the weight of the selected term. Since the selected term was not found to match (exactly or as a variant) any of the terms within the historical query, no weight is added to the AMS tally.

If the selected term is not an optional term (step 6014), then the MMS tally, and possibly the AMS tally, can be adjusted by a penalty weight for missing a stopword term (step 6018). The penalty applied can be determined in a similar fashion to the penalty for a missing optional term. The penalty weight for a missing stopword term can be a weight, such as 0.1, 0.2, 0.5, 0.75, or 0.95.

After the AMS and MMS tallies have been adjusted for the selected term (steps 6006, 6010, 6016, and 6018), then a determination can be made as to whether any terms from the input query have yet to be compared to the historical query (step 6020). If terms from the input query have yet to be compared, then step 6002 is repeated for one of these terms.

TABLE 2 below provides an example comparison between the input query "best snorkel reef Mexico" and the historical queries "best snorkeling reef México," "snorkeling reefs Cozumel," and "Mexico best dive location." The weight assigned to each of the terms of the input query is provided in parenthesis. In this example, optional terms are assigned a weight of 0.6 and regular terms are assigned a weight of 1.0. As compared to each of the terms of the input query, the determined weights for the historical queries are provided with the reason for the weight in parenthesis. An "exact match" designation indicates an exact match of the term from the input query was found in the historical query. A "stem," "synonym," or "diacritical variant" designation indicates that a variant of the input query term was found in the historical query. In this example, diacritical variants are permitted. The weights provided in this example are for illustrative purposes.

An AMS tally and an MMS tally are provided for each historical query. These values are determined by the determined weights for the historical queries. A "no match" designation indicates that an optional term did not match a term in the historical query. A penalty weight is provided for "not match" optional terms in the amount of 0.4. This penalty value is only applied to the MMS tally. The variants of a variant term are listed below the variant term.

TABLE 2

| Input Query Term | "best snorkeling reef México" | "snorkeling reefs Cozumel" | "Mexico best dive location" |
|---|---|---|---|
| "best" - optional (0.6) | 0.6 (exact match) | (no match - 0.4) | 0.6 (exact match) |
| "snorkel" - variant term (1.0) | no match - consider variants | no match - consider variants | no match - consider variants |
| "snorkeling" - variant (0.9) | 0.9 | 0.9 | — |
| "dive" - variant (0.75) | — | — | 0.75 |
| "reef" - variant term (1.0) | 1.0 (exact match) | no match - consider variants | no match - consider variants |
| "reefs" - variant (0.95) | — | 0.95 | — |
| "location" - variant (0.65) | — | — | 0.65 |
| "Mexico" - variant term (1.0) | no match - consider variants | no match - consider variants | 1.0 (exact match) |
| "México" - variant (0.95) | 0.95 | — | — |
| "Cozumel" - variant (0.7) | — | 0.7 | — |
| AMS tally | 3.45 | 2.55 | 3.0 |
| MMS tally | 0.513 | 0.239 | 0.293 |

As displayed above in Table 2, the historical query with the greatest AMS and MMS tallies is "best snorkeling reef México."

If all of the terms of the input query have been compared, then the second part of technique 6000 (determining the match score for the historical query) beings. At step 6022, it is determined whether the terms of the historical query are out of order relative to the input query (e.g., the terms are a permutation of the historical query). For example, the terms in the historical query "Mexico best dive location" from TABLE 2 are out of order relative to the input query "best snorkel reef Mexico."

If the terms are out of order, an out of order penalty can be applied to any weight tallies for historical query (step 6024). In some implementations, the penalty is a nominal amount, such as 0.1, 0.2, 0.35, or 0.5. In some implementations, the penalty can depend on the degree by which the terms of the historical query are out of order. A historical query that is more out of order can received a larger penalty than a historical query that is less out of order. The penalty can be subtracted from the AMS tally and can be multiplied to the MMS tally. The penalty amount for the AMS tally and the MMS tally can differ.

In addition to, or instead of, applying an out of order penalty to weight tallies for the selected historical query, a penalty can be applied for a compound term in the input query that is "broken" in the selected historical query. A compound term can be a collection of two or more terms that, when taken together, convey a concept. If the concept conveyed by a compound term in the input query is not conveyed by terms in the selected historical query (the compound term is "broken"), then a penalty can be applied to the match weights for the historical query—a historical query that does not contain a concept of the input query is less likely to be a good match for the input query.

For example, the terms "new york" can be considered a compound term. If the input query contains the terms "restaurants new york" and the historical query contains the terms "new restaurants york," then the compound term "new york" can be determined to be broken in the historical query based upon the term "new" being separated from "york" by the term "restaurant." Accordingly, a penalty can be applied to the match weights for historical query.

However, if the historical query were to contain the terms "new york restaurants," then the compound term "new york" from the input query can be determined to be intact in the historical query. Accordingly, a penalty for a broken compound would likely not be applied to the historical query. Instead, an out of order penalty (discussed above with regard to steps 6022-6024) could be applied to the historical query based upon the term "restaurants" occurring after "new york." An out of order penalty can be less than a penalty for a broken compound term—a broken compound term can more strongly indicate that a historical query is not a good match to the input query than out of order terms.

An example technique for identifying and penalizing broken compound terms is provided by steps 6026-6032. In the example technique, the input query is analyzed to determine whether the input query contains a compound term (step 6026). Such analysis can involve using compound term information for the input query provided by an external system, such as the compound term identification engine 3080. Using the compound term information from an external system, compound terms can be identified in the input query based upon identifiers that enumerate compound terms (and non-compound terms) in a query. For example, the query "new york restaurants" can be provided with the following compound term identifiers: "new"—1; "york"—1; "restaurants"—0. In this example, the identifier "0" indicates that "restaurants" is not part of a compound term and the identifier "1" indicates the terms that are part of the first compound term in the input query. More than one compound term can be identified in a query and a term can be identified as being part of more than one compound term.

Additionally, as described above with regard to the compound term identification engine 3080, compound terms can be provided with a confidence score that indicates a likelihood that the collection of terms identified as a compound term was intended as such by the user submitting the input query. Using confidence scores, a compound term can be identified at step 6026 if the confidence score for the compound term is greater than or equal to a threshold confidence score. For example, if confidence scores range from 0.0 (lowest confidence score) to 1.0 (greatest confidence score) and the confidence score threshold is 0.5, then a collection of terms (e.g., "new york") with a confidence score of 0.9 can be determined at step 6026 to be a compound term at step 6026. The threshold confidence score can vary (e.g., 0.2, 0.25, 0.3, 0.5, 0.66, 0.75, etc.).

If the input query is determined to contain a compound term, then a determination can be made as to whether the compound term is "broken" in the selected historical query (step 6028). A compound term is broken in a historical query when the concept conveyed by the compound term is no longer conveyed in the historical query. In one example, a compound term is broken when the collection of terms that make-up the compound term are out of order. For instance, if the compound term "new york" is present in the input query and the historical query includes "york new," then the compound term is broken based upon the terms "new" and "york" being out of order in the historical query.

In another example, a compound term is broken when a non-compound term is inserted between the terms that make-up the compound term. For instance, if the input query contains the compound term "new york" and the historical query contains "new restaurants york," then the compound term is broken based upon "restaurant" breaking-up the compound terms "new" and "york."

In some implementations, a compound term from the input query is not determined to be broken if the variation of the compound term in the historical query has a threshold presence in documents that are identified as results for the input query. For example, when the input query has the compound term "new york" and the historical query has the term "york new," if the term "york new" appears a threshold number of times in documents identified for the input query (containing the compound "new york"), then the compound term can be determined to be present (not broken) in the historical query.

If the compound term from the input query is broken, then a penalty for the broken compound term can be determined (step 6030). The penalty can be determined in a variety of ways. For example, the determined penalty can be a standard penalty (e.g., multiply match weight by 0.1, 0.2, 0.33, 0.5, 0.66, etc.) that is used when a compound term is broken. In some implementations, the standard penalty can be determined if the confidence score of a broken compound term is greater than or equal to a confidence score threshold (e.g., 0.2, 0.25, 0.3, 0.5, 0.66, 0.75, etc.), then a standard penalty can be determined. In another example, the determined penalty can be dependent upon the confidence score associated with the broken compound term, such as min(0.1, 1.0−confidence score) (when the confidence score ranges from 0.0-1.0).

In a further example, the penalty determined for the broken compound term can depend upon the number of compounds contained within the input query. A smaller penalty can be applied when fewer than all of the compound terms of the input query are broken (e.g., the input query has two compound terms and one is broken in the historical query). For example, in the input query "apple pie new york," there are two compound terms: "apple pie" and "new york." If the "new york" compound is broken in a historical query but the "apple pie" compound is not, then the penalty determined for the broken compound can be less than if the input query did not contain the second compound term ("apple pie"). The presence of the second compound in the historical query provides a stronger indication that historical query is similar to the input query than if all of the compound terms from the input query were broken in the historical query. For example, the penalty could be based upon a formula that takes into consideration the number of broken compounds, such as max(1.0, (number of compounds−number of broken compounds)/number of compounds+0.1).

The determined penalty for the broken compound term can be applied to the match weight tallies (e.g., AMS tally and MMS tally) (step 6030). For example, the determined penalty (e.g., 0.1, 0.2, 0.5, etc.) can be multiplied to the match weight tallies (e.g., AMS tally=AMS tally*0.1; MMS tally=MMS tally*0.1, etc.). In another example, the determined penalty can be added to, subtracted from, divided into the match weight tallies.

Once the term weights for a historical query have been determined, the weights can be combined to provide a full match score (referred to above as a "match score" for a historical query) for the historical query. The full match score can be determined in a variety of ways. In some implementations, an adjusted match score serves as the full match score. In some implementations, an MMS (multiplicative match score) serves as the full match score. In some implementations, a linear approximation between an adjusted match score and the MMS serves as the full match score. An example technique for determining the full match score is provided by steps 6034-6040.

The adjusted match score can be determined (step 6034) from the AMS ("absolute match score"). The AMS can be represented by the value of the AMS tally. The adjusted match score can be equal to the AMS ("absolute match score") divided by a number of terms. In some implementations, the number of terms is the number of terms in the historical query. In some implementations, the number of terms is the number of terms in the input query. In some implementations, the number of terms is the number of terms from the input query that matched the historical query. For example, referring to TABLE 2 above, the adjusted match score for the historical query "best snorkeling reef Mexico" can be 0.86 (3.45 (AMS tally) divided by 4 (number of terms)).

In some implementations, the adjusted match score can be determined by dividing the AMS by the sum of the weights of the input query (excluding the weights of variants of a variant term). For instance, the sum of the weights of the input query from TABLE 2 above is 3.6 ("best" weight (0.6)+"snorkel" (1.0)+"reef" (1.0)+Mexico (1.0)). The adjusted match score for the historical query "best snorkeling reef México" would be 0.96 (3.45 (AMS tally) divided by 3.6 (sum of weights for input query)).

The MMS can be determined by referring to the MMS tally (step 6036). For instance, the MMS of the historical query "best snorkeling reef México" from TABLE 2 is 0.513 (the MMS tally). In implementations in which an MMS tally is not used, the MMS is determined by multiplying weights determined for the terms from the historical query that matched a term from the input query. The MMS tally can be multiplied by 1.0 when a regular term, a variant term, an optional term, or a stopword term are from the input query are found to match a term in the historical query. The MMS tally can be multiplied by the weight of a variant that is found to match when the variant term does not match. The MMS tally can also be multiplied by penalty weights for optional terms and stopword terms that are not found to match a term in the historical query.

Once the adjusted match score and the MMS have been determined, a linear approximation between the two can be made (step 6038). In some implementations, the linear approximation is an average of the adjusted match score and the MMS. In some implementations, the linear approximation is based on the difference between the adjusted match score and the MMS, and the difference between the length of the historical query and the length of the input query. In some implementations, the linear approximation can attempt to derive a score that is closer to the adjusted match score if there are a lot of variant matches and closer to the MMS if there are a lot of stopword or optional terms that did not match. For example, the linear approximation could be determined by multiplying a weight by the MMS and adding it to the product of 1.0 minus the weight by the adjusted match score (e.g., (weight*MMS)+((1.0−weight)*adjusted match score)). The weight can be a ratio of the terms that did not match (e.g., optional and stopword terms that did not match) over the number of terms in the input query. The full match score for the historical query is determined using on the adjusted match score, the MMS, or the linear approximation (step 6040). A determination of which score serves as the full match score can depend on the length of the historical query in relation to the length of the input query. If the length of the historical query is equal to the length of the input query, then the adjusted match score can be used for the full match score. If the length of the historical query is a threshold number of terms less than the length of the input query, then the multiplicative match score can serve as the full match score. The threshold number of terms can be a static number (e.g., 2, 3, 5, etc.) or it can be dynamic (e.g., a percentage of the length of the input query, such as 10%, 20%, 50%, etc.). In the in-between case, the linear approximation between the adjusted match score and the multiplicative match score can be used.

For instance, for the historical query "best snorkeling reef México" from TABLE 2, the adjusted match score could serve as the full match score because the length of the historical query is the same as the length of the input query.

After determining the full match score for the historical query, the technique 6000 ends. As depicted in FIG. 5, the technique 6000 can be performed for each of a set of historical queries. The full match scores determined for the set of historical queries can then be used at step 5016 to determine which of the historical queries should contribute user behavior data (e.g., determine which of the historical queries are the most similar to the input query).

Various alternative implementations of technique 6000 are possible. For example, the terms of the historical query can be compared one-by-one against the terms of the input query.

Figure 7A:
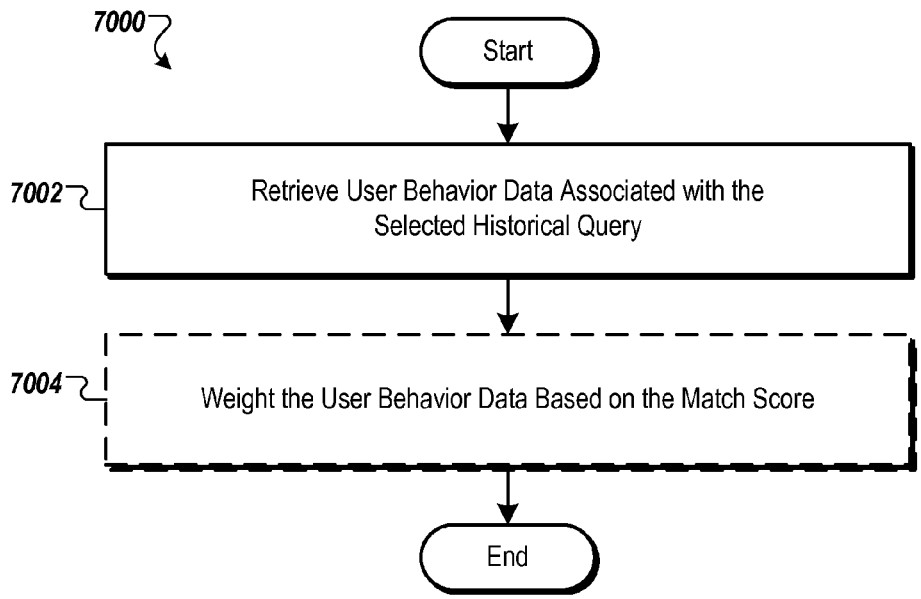
FIGS. 7A-D are flow charts describing example techniques of borrowing data from historical queries for an input query.
Figure 7B:
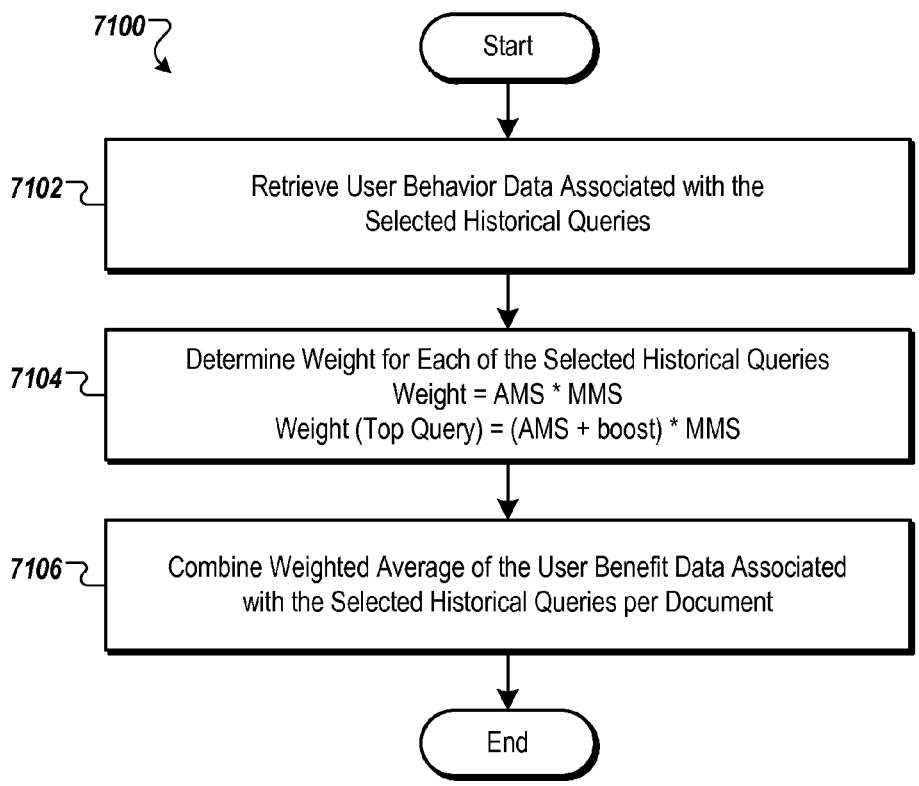
Figure 7C:
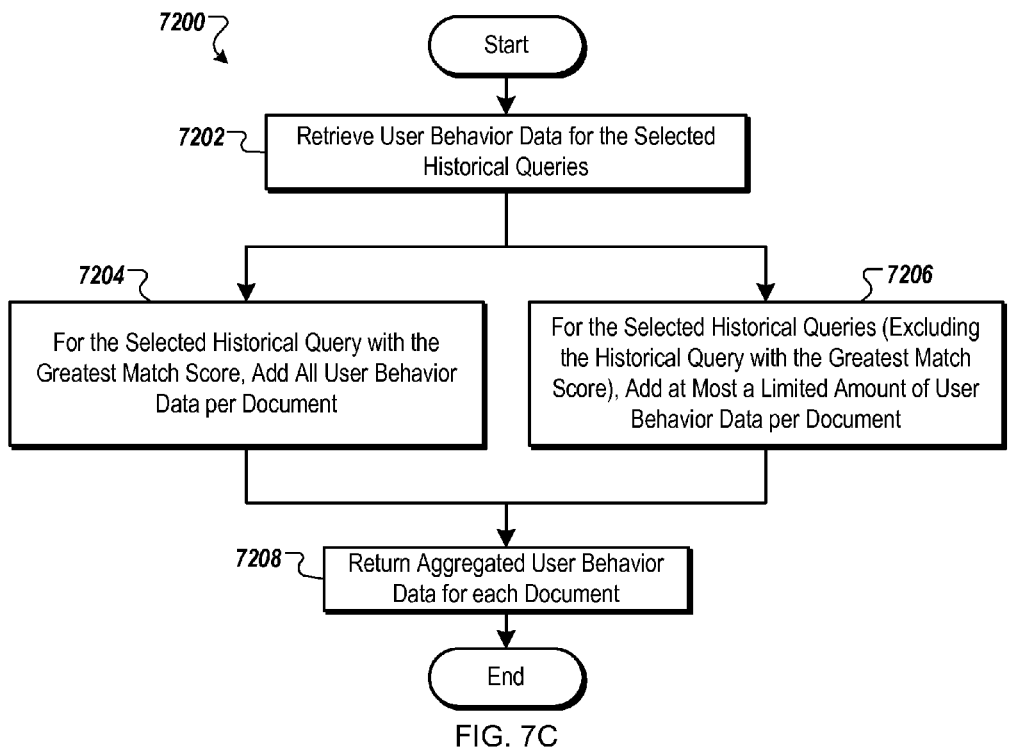
Figure 7D:
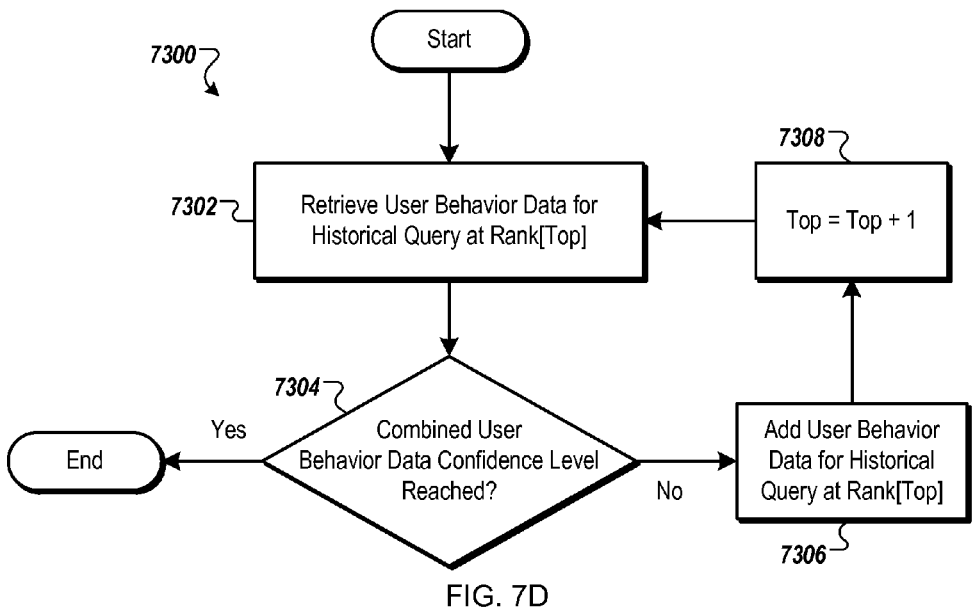

FIGS. 7A-D are flow charts describing example techniques of borrowing data from historical queries for an input query. Each of the FIGS. 7A-D depicts a different technique for borrowing data from historical queries for the input query. FIG. 7A depicts a technique of borrowing data from a single historical query. FIGS. 7B-D depicts techniques for borrowing data from multiple historical queries. The techniques depicted can be performed by a variety of systems, for example, by the server system 2014 and its rank modifier engine 2056, as described with reference to FIG. 2, or by the information retrieval system 3000 and its rank modifier engine 3070, as described with reference to FIG. 3. The techniques can be performed as part of technique 5000 from FIG. 5, for example, at step 5018.

FIG. 7A is a flow chart describing an example technique 7000 of borrowing data from a single historical query for an input query. The technique 7000 can be performed after a single historical query has been selected. As described with reference to step 5016, the single historical query selected can be a historical query that is determined to have the greatest degree of similarity to the input query (e.g., the greatest match score). In some implementations, the single query is a historical query that has the greatest combination of user behavior data and similarity to the input query.

At step 7002, the user behavior data associated with the single, selected historical query is retrieved from a data repository. For example, the user behavior data can be retrieved from the data repository 1014, described above with reference to FIG. 1.

In some implementations, the retrieved user behavior data associated with the historical query is weighted (step 7004). In such implementations, the user behavior data can be multiplied by a weight that is based upon the match score for the historical query. Although the selected historical query can be the most similar historical query to the input query, such weighting can account for any determined dissimilarity between the historical query and the input query. Thus, instead of using the full amount of user behavior data from the single historical query, an amount of the user behavior data proportioned to the confidence in the match (e.g., the similarity between the historical query and the input query) can be used. The weight applied to the user behavior data can be the match score itself, the AMS multiplied by the MMS, the adjusted match score multiplied by the MMS, the MMS, or some other combination thereof.

For purposes of providing a simplified example, the user behavior data associated with the single selected historical query is long click data and the selected historical query has an example weight of 0.8. For documents A, B, and C having long click data in amounts of 10,000 clicks, 100 clicks, and 10 clicks, respectively, the weighted user behavior data for A, B, and C could be 8,000 clicks, 80 clicks, and 8 clicks, respectively. This weighted user behavior data could then be used to determine a quality of result statistic for documents A, B, and C.

The technique 7000 ends once the user behavior data that has been retrieved and possibly weighted. This user behavior data can be used to determine a quality of result statistic for each document at step 5020.

FIGS. 7B-D are flow charts describing an example techniques 7100, 7200, and 7300, respectively, of borrowing data from multiple historical queries for an input query. The techniques 7100-7300 can be performed after multiple historical queries have been selected. As described above with regard to step 5016 depicted in FIG. 5, selection of the multiple historical queries can be based upon match scores for the historical queries and can be performed in a variety of ways. In some implementations, the multiple historical queries selected is a group of historical queries determined to have the greatest degree of similarity to the input query (e.g., the greatest match score). In some implementations, the selected group of historical queries are the historical queries that have the greatest combination of user behavior data and similarity to the input query.

FIG. 7B depicts the example technique 7100 that regards combining user behavior data from multiple historical queries using a weighted average of the user behavior data. To begin, user behavior data associated with the selected historical queries is retrieved from a data repository (step 7102).

To combine the user behavior data from the multiple selected queries, a weighted average of the user behavior data can be used. The weight for each of the selected historical queries can be determined in variety of ways (step 7104). As provided in the example at step 7104, the weight can be the AMS multiplied by the MMS for a historical query. The weight can also be the full match score itself, the adjusted match score multiplied by the MMS, the MMS, or some other combination thereof.

In some implementations, the selected historical query having the greatest full match score receive a boost to its weight. As provided in the example at step 7104, the boost can be an amount added to the AMS before it is multiplied by the MMS. The boost amount can be a static value (e.g., 0.1, 0.5, 1.0, 2.0, etc.) or it can be a percentage of the AMS (e.g., 10%, 25%, 50%, etc.). A boost can be applied to the weight for a historical query in a variety of other ways, including increasing the MMS before multiplication and incrementing the determined weight after multiplication.

Using the determined weights for each historical query, the user behavior data for the selected historical queries are combined by determining the weighted average of user behavior data per document (step 7106). The documents for which user behavior data is combined can include the documents for which there is user behavior data associated with some or all of the selected historical queries. For each document, the weighted average of user behavior data can be an aggregate of the weighted user behavior data (e.g., user behavior data for a historical query multiplied by the weight for the historical query) for the selected historical queries divided by an aggregate of the weights for the selected historical queries.

TABLE 3 below provides an example of combining user behavior data associated with historical queries HQ1, HQ2, and HQ3 using the weighted average. In this example, the weight for HQ1, HQ2, and HQ3 is 0.75, 0.6, and 0.4, respectively. Each of the historical queries has user behavior data (represented as an example number of long clicks) for documents A, B, and C. The user behavior data for each historical query is weighted and then averaged using the aggregate weight for the historical queries, as depicted below. The aggregate weight for the historical queries HQ1-HQ3 is 1.75 (0.75+0.6+0.4).

TABLE 3

| Document | HQ1 | HQ2 | HQ3 | Weighted Avg. |
|---|---|---|---|---|
| A | 1,000 * 0.75 = 750 | 100 * 0.6 = 60 | 500 * 0.4 = 200 | (750 + 60 + 200)/ 1.75 = 577 |
| B | 500 * 0.75 = 375 | 700 * 0.6 = 420 | 200 * 0.4 = 80 | (375 + 420 + 80)/ 1.75 = 500 |
| C | 400 * 0.75 = 300 | 600 * 0.6 = 360 | 1,000 * 0.4 = 400 | (300 + 360 + 400)/1.75 = 605 |

As provided above in TABLE 3, the user behavior data associated with each historical query is multiplied by the weight for the historical query. The weighted values for each document are then combined and averaged by the aggregate weight of the historical queries. Given the example scenario provided above, the document C ends up with the greatest combined user behavior data, barely edging out the document A even though the document C has 25% more associated click data (document A has 1,600 associated clicks and document C has associated 2,000 clicks).

The technique 7100 ends once the user behavior data for each document has been combined using a weighted average. This combined user behavior data can be used to determine a quality of result statistic for each document, for example, at step 5020.

FIG. 7C depicts the example technique 7200 that regards aggregating user behavior data associated with each of the selected historical queries in limited amounts. For instance, the technique 7200 can provide that each historical query can contribute at most a threshold amount (e.g., a maximum amount) of user behavior data for each document. To begin, user behavior data associated with the selected historical queries is retrieved from a data repository (step 7202).

To combine the user behavior data from the multiple selected queries, the user behavior data can be aggregated without weights. For each document, the user behavior data for the document that is associated with the selected historical query having the greatest match score can be added without limit (step 7204). The user behavior data can be added to a tally of user behavior data for the document.

To combined the user behavior data from the selected historical queries that do not have the greatest match score, a limit can be applied to the amount of user behavior data that each historical query can contribute to the tally for any one document (step 7206). For example, if user behavior represents long click data, each selected historical query can be limited to contributing at most 500 long clicks (e.g., the contribution of each historical query is capped at 500 long clicks) for each document. As described above with regard to FIG. 7B, the documents for which user behavior data is combined can include the documents for which there is user behavior data associated with some or all of the selected historical queries.

In some implementations, the same limit can be applied to each of the historical queries (e.g., each historical query is limited to contributing at most 500 clicks). In some implementations, the limit varies per historical query. Such variation in the limit can be based upon the match score for a historical query (e.g., historical queries with a greater match score can contribute more clicks), the match score rank for a historical query (e.g., the second ranked historical query can contribute 90% of its user behavior, the third ranked historical query can contribute 80% of its user behavior data, etc.), or a determined weight for a historical query (e.g., historical queries with a greater weight can contribute more clicks). In such implementations, the historical query with the greatest match score can also be limited based upon its match score, rank, or determined weight.

Once the limited (or unlimited) user behavior from each of the selected historical queries has been added for each document, the aggregated (combined) user behavior data can be returned (step 7208). This combined user behavior data can be used to determine a quality of result statistic for each document, for example, at step 5020.

TABLE 4 below provides an example of combining user behavior data from multiple historical queries using the technique 7200. TABLE 4 uses the same user behavior data associated with historical queries HQ1, HQ2, and HQ3 provided above for TABLE 3. In this example, the user behavior data for the historical query with the greatest match score is not limited and the user behavior data for all other historical queries is capped at 500 clicks. The historical query with the greatest match score is HQ1. In the table below, the symbol '→' indicates the user behavior data to the left has been limited to the value to the right (e.g., "600→500" indicates that 600 clicks exist, but only a contribution of 500 clicks is permitted).

TABLE 4

| Document | HQ1 | HQ2 | HQ3 | Aggregate (Limited) Data |
|---|---|---|---|---|
| A | 1,000 | 100 | 500 | 1,000 + 100 + 500 = 1,600 |
| B | 500 | 700 → 500 | 200 | 500 + 500 + 200 = 1,200 |
| C | 400 | 600 → 500 | 1,000 → 500 | 400 + 500 + 500 = 1,400 |

As depicted above in TABLE 4, the user behavior data associated with historical queries HQ2 and HQ3 is capped at 500 clicks. Using the example data scheme provided above, document A ends up with the greatest combined user behavior data.

FIG. 7D depicts the example technique 7300 that regards aggregating user behavior data associated with the selected historical queries one query at a time until a threshold amount of user behavior data has been collected. Under the technique 7300, the historical queries that are able to contribute user behavior data can be limited, but the amount of user behavior data that can be contributed from a single historical query can be unlimited. For instance, if five historical queries were selected, all of the historical data associated with three of them could be aggregated to form the combined user behavior data.

To begin, user behavior data associated with the selected historical query having the top rank (e.g., the historical query with the greatest match score or weight) can be retrieved (step 7302). In some implementations, the rank can be based on a combination of the match score for a historical query and the amount of user behavior data associated with the historical query.

Once the user behavior data has been retrieved for the top ranked historical query, a determination can be made as to whether a confidence level for the combined (e.g., aggregated) user behavior data has been reached (step 7304). The confidence level can be a threshold amount of user behavior data that has been aggregated. The confidence level can be indicated in a variety of ways. In some implementations, the confidence level is based on an amount of favorable user behavior data (e.g., long clicks) that has been aggregated for all documents. In some implementations, the confidence level can be based on an amount of all user behavior data (e.g., short, medium, and long clicks) that has been aggregated for each document or for all documents.

If a confidence level of user behavior data has not yet been aggregated, then the user behavior data associated with the top ranked historical query can be added to the combined user behavior data (step 7306). In some implementations, the user behavior data can be added without limitation. In some implementations, the user behavior data can be weighted in manner similar to that described above with regard to techniques 7000 and 7100.

Once the user behavior data has been added to the combined user behavior data, an identifier for the top ranked historical query can be incremented (e.g., changed from referring to the first ranked query to the second ranked query) (step 7308) and the user behavior data for the next ranked historical query can be retrieved at step 7302. The loop of steps 7302-7308 can proceed until a confidence level for the user behavior data has been reached. When the confidence level has been reached, the technique 7300 can end. The order of the steps 7302-7308 can be performed in a variety of orders not depicted.

TABLE 5 below provides an example of combining user behavior data from multiple historical queries using the technique 7300. TABLE 5 uses the same user behavior data associated with historical queries HQ1, HQ2, and HQ3 provided above for TABLES 3-4. In this example, the confidence level is reached once at least 2,500 clicks have been aggregated into the combined user behavior data. The rank for the historical queries is from HQ1 (top rank) to HQ3 (bottom rank).

TABLE 5

| Document | HQ1 | HQ2 | HQ3 | Combined User Behavior Data |
|---|---|---|---|---|
| A | 1,000 | 100 | 500 → 0 | 1,000 + 100 + 0 = 1,100 |
| B | 500 | 700 | 200 → 0 | 500 + 700 + 0 = 1,200 |
| C | 400 | 600 | 1,000 → 0 | 400 + 600 + 0 = 1,000 |

In the example depicted in TABLE 5, the user behavior data associated with historical queries HQ1 and HQ2 were added because the confidence level for the combined user behavior data (2,500 clicks) had not yet been reached (for HQ1 the combined user behavior data was zero clicks before it was added and for HQ2 the combined user behavior data was 1,900 clicks before it was added). The user behavior data associated with the historical query HQ3 was not added because the confidence level for the combined user behavior data had already been reached (the combined user behavior data was 3,300 clicks, which exceeds the confidence level threshold of 2,500 clicks).

The techniques 7000-7300 can be combined in various ways that have not been described. For example, a weighted average of user behavior data from technique 7100 can be used with the confidence level threshold from technique 7300. Additionally, various combinations of features not explicitly described in combination are possible.

Figure 8:
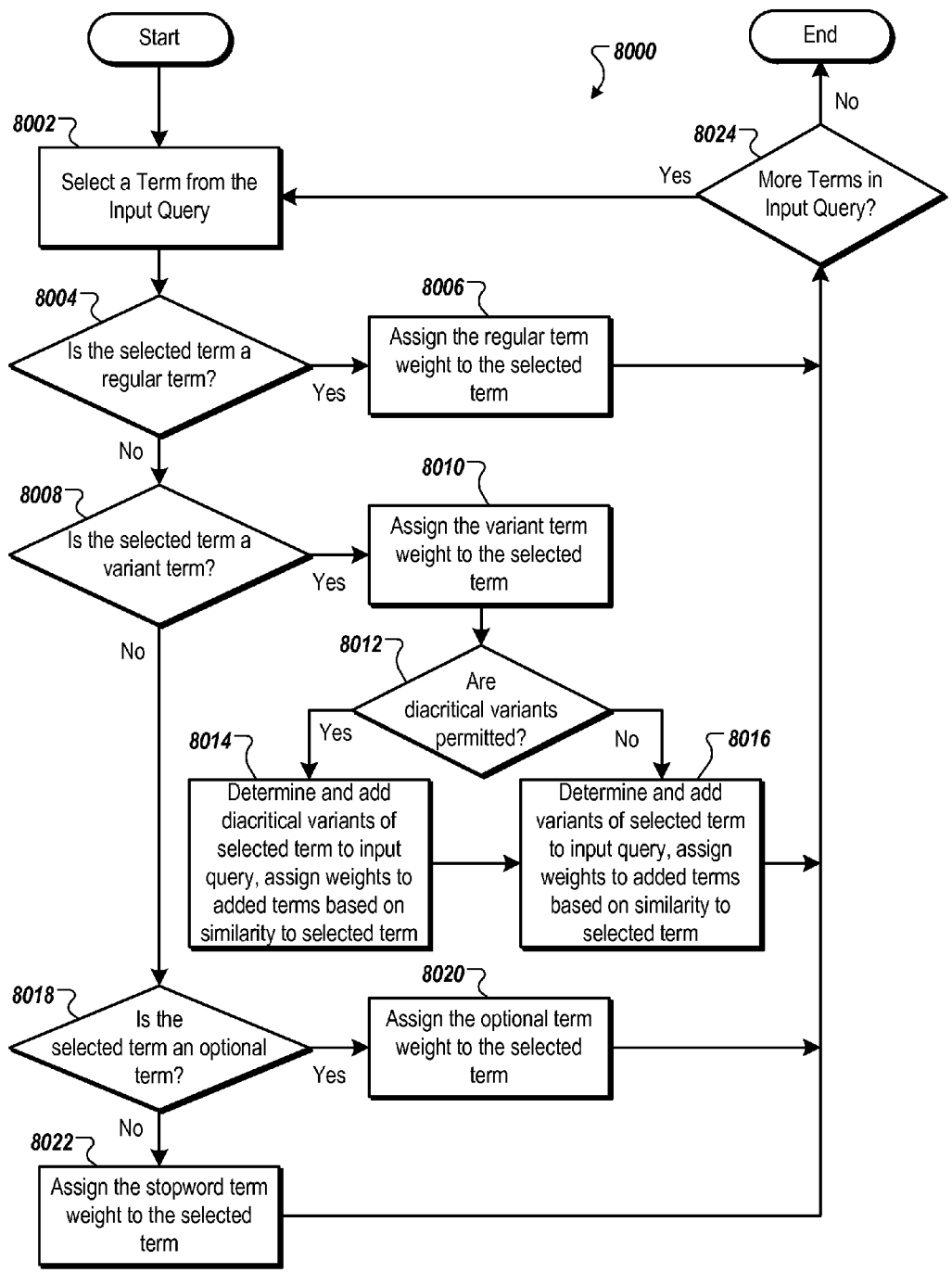
FIG. 8 is a flow chart describing an example technique for assigning weights to an input query.

FIG. 8 is a flow chart describing an example technique 8000 for assigning weights to an input query. The technique 8000 can be performed by a variety of systems, for example, by the server system 2014 and its rank modifier engine 2056, as described with reference to FIG. 2, or by the information retrieval system 3000 and its query scoring engine 3090, as described with reference to FIG. 3. The technique 8000 can be performed as part of technique 5000 from FIG. 5. For example, the technique 6000 can be performed at step 5008.

At step 8002, a term from the input query is selected. Once a term has been selected, a determination is made as to the type (e.g., regular term, variant term, optional term, or stopword term) for the selected term at steps 8004, 8008, and 8018. Once the term type is determined, a weight is assigned to the term at steps 8006, 8010, 8014, 8016, 8020, and 8022. Although this example technique 8000 only describes the four enumerated term types, other term types are possible.

At step 6004, a determination is made as to whether the selected term is a regular term. If the selected term is a regular term then the weight for a regular term is assigned to the selected term (step 8006). Regular terms and their weights are described above.

If the selected term is not a regular term, then a determination is made as to whether the selected term is a variant term (step 8008). If the selected term is a variant term, then a weight is assigned to the variant term (step 8010). Variant terms and the weights for variant terms are described above.

Variants of the variant terms are then determined. Variants can include stems, synonyms, and diacritical variants. The application of diacritical variants can be limited, depending on whether diacritical variants are permitted for the input query. At step 8012, a determination can be made as to whether diacritical variants are permitted for the input query. A diacritical variant is a term that varies from the selected term from the input query by at least one diacritical character (e.g., the term "cliche" is a diacritical variant of the term "cliché"). A diacritical character is a character with a mark or special script added to a letter to indicate a distinct phonetic value or to distinguish words that are otherwise graphically identical (e.g., à, è, ì, ò, ù, á, é, í, ó, ú, ý, â, ê, î, ô, û, ã, ñ, õ, ä, ë, ï, ö, ü, ÿ, å, æ, œ, ç, ð, ø, β, etc.).

Determining whether diacritical variants are permitted can depend on a variety of factors, including the locale from which the input query is submitted. For instance, diacritical variants can be permitted if the input query originates from a locale where diacriticals are used loosely (e.g., users in the locale typically use non-diacritical characters to refer to diacritical character and vice a versa, such as "a" as a substitute for "á"). However, diacritical variants can be prohibited (not permitted) if the input query originates from a locale where diacriticals are used strictly (e.g., users do not use non-diacritical characters to refer to diacritical characters). Identifying how loosely or strictly a locale uses diacriticals can be based upon, at least, the languages spoken in the locale and user interaction with query results having diacritical variants such as whether users within the locale clicks on query results containing a diacritical variant of a term from the input query, for instance.

In some implementations, diacritical variants are always permitted. In such implementations, the weight for a diacritical variant can be based on, in part, the locale from which the input query was submitted (e.g., whether the input query originated from a locale with loose or strict diacritical variant usage).

If it is determined that diacritical variants are permitted, then a diacritical variants of the selected term are determined and added to the input query (step 8014). As provided above in TABLE 2, the term "México" was added to the input query as a diacritical variant of the variant term "Mexico." Determination of whether a term is a diacritical variant of a variant term can be made on a per word or a per character basis.

If a diacritical variant is found, then weight for the diacritical variant can be determined and assigned to the diacritical variant. The weight for a diacritical variant can be determined based on a similarity between the diacritical variant and the variant term, a similar manner as described above with regard determining the weight for variant terms. Diacritical variants can be assigned the same weight as the variant term from which they were derived. Additionally, the degree to which diacritical characters are used loosely or strictly (e.g., likelihood that a user within the locale intended for a diacritical character substitution) can be factored into the weight of a diacritical variant. For example, if a diacritical variant is found to match the selected term from the input query, the diacritical variant can have a greater weight if the input query originated from a locale with loose diacritical character usage instead of from a locale with strict diacritical character usage.

If diacritical variants are not permitted for the input query (step 8012), then variants of the selected term can be determined and added to the input query (step 8016). Step 8016 can be performed after diacritical variants have been determined at step 8014. Determination of variants of the selected term is described above and is performed in a manner similar to the determination of diacritical variants. Referring to TABLE 2 as an example, variants "snorkeling" and "diving" were added to the input query for the variant term "snorkel." Variant terms are additionally assigned weights that indicate a degree of similarity to the selected term within the context of the input query. Referring to TABLE 2 as an example again, the variant "snorkeling" is assigned a greater weight than the term "diving" because it has a higher degree of similarity to the variant term "snorkel" within the context of the input query.

If the selected term is not a variant term (step 8008), then a determination is made as to whether the selected term is an optional term (step 8018). If the selected term is an optional term, then the selected term is assigned a weight for the optional term (step 8020). The weights for optional terms are described above.

If the selected term is not an optional term, then the selected term is a stopword term and is assigned a weight for stopword terms (step 8022). Were more term types described in this example technique 8000, then there would be a determination made as to whether the selected term is a stopword term before step 8022 (similar to step 8018 for stopword terms). The weights for stopword terms are described above.

After a weight has been assigned to the selected term from the input query and any variants of the selected term have been added to the input query, a determination is made as to whether there are additional terms to be assigned a weight in the input query (step 8024). If there are more terms to be assigned a weight, then step 8002 is repeated for one of those terms. If all of the terms from the input query have been assigned a weight, then technique 8000 ends.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
for a document identified as a search result of a user-submitted query, scoring one or more other queries based upon a similarity to the user-submitted query, each of the one or more other queries being different from the user-submitted query, where scoring the one or more other queries comprises:
receiving optional terms, regular terms, and stopword terms of the user-submitted query;
receiving an optional-term weight, a regular-term weight, and a stopword-term weight;
receiving terms of the one or more other queries;
determining for each of the other queries whether the other query includes an exact match for each required term in the user-submitted query and, if not, removing the other query from consideration; and determining a respective match score for each of the other queries not removed from consideration, including adjusting the respective score by the regular-term weight for each regular term of the user-submitted query that appears in the other query, adjusting the respective score by the optional-term weight for each optional term of the user-submitted query that appears in the other query, and adjusting the respective score by the stopword-term weight for each stopword term of the user-submitted query that appears in the other query, wherein all operations of adjusting by a weight are the same operation, and all operations of adjusting either add the weight to the respective match score or multiply the respective match score by the weight; and determining a respective score for each other query not removed from consideration from the match score for the other query;

selecting one or more of the other queries based on each of the respective scores of the other queries;

deriving a quality of result statistic for the document from respective data associated with the selected queries, the respective data being indicative of prior user interaction with the document when the document was provided as a search result for the selected queries; and providing the quality of result statistic as the quality of result statistic input to a document ranking process for the user-submitted query, the document ranking process configured to rank a plurality of documents responsive to the user-submitted query.

2. The method of claim 1 in which one of the respective scores is decreased by a penalty amount when terms in a corresponding one of the other queries are in a different order than the terms in the user-submitted query.

3. The method of claim 1 in which selecting one or more of the other queries comprises selecting one query having a greatest respective score.

4. The method of claim 1 in which the respective data is aggregated click data.

5. The method of claim 1, further comprising limiting the quality of result statistic for the document according to a threshold.

6. The method of claim 1, further comprising reducing the quality of result statistic for the document by an amount based upon a degree of dissimilarity between the document and at least one of the terms in the user-submitted query.

7. The method of claim 1 in which deriving the quality result statistic further comprises weighting the respective data associated each of the selected queries by the respective scores for each of the selected queries and aggregating the weighted respective data.

8. The method of claim 1, further comprising:
determining a penalty based upon the user-submitted query containing a compound term that is broken in one or more of the other queries; and
applying the determined penalty to one or more of the respective scores for the one or more other queries.

9. The method of claim 1, wherein, for at least one of the other queries not excluded from consideration, determining a respective score comprises:
calculating a multiplicative match score and an absolute match score for each of the other queries not removed from consideration based on the weights, where the multiplicative match score is determined based on multiplication of the weights and wherein the absolute match score is determined based on addition of the weights;
determining whether to use the absolute match score, the multiplicative match score, or a combination thereof as the respective score for each of the other queries not removed from consideration based on a comparison of lengths of the user-input query and the other query; and
based on the determination of whether to use the absolute match score, the multiplicative match score, or the combination thereof, calculating the respective score for the other queries not removed from consideration using the absolute match score, the multiplicative match score, or the combination thereof.

10. The method of claim 9 in which the combination of the absolute match score and the multiplicative match score is determined by linearly approximating a difference between the absolute match score and the multiplicative match score.

11. The method of claim 1 where scoring the one or more other queries comprises:
receiving one or more variant terms of the user-submitted query and one or more variants of each of the variant terms; and
receiving, for each variant term and for each variant of the variant term, an associated variant-term weight;
wherein determining a respective score for the other queries not removed from consideration further includes adding to the respective score the variant-term weight for each variant term that appear in the other query.

12. A computer program product encoded on a non-transitory computer-readable medium, operable to cause data processing apparatus to perform operations comprising:
for a document identified as a search result of a user-submitted query, scoring one or more other queries based upon a similarity to the user-submitted query, each of the one or more other queries being different from the user-submitted query, where scoring the one or more other queries comprises:
receiving optional terms, regular terms, and stopword terms of the user-submitted query;
receiving an optional-term weight, a regular-term weight; and a stopword-term weight;
receiving terms of the one or more other queries;
determining for each of the other queries whether the other query includes an exact match for each required term in the user-submitted query and, if not, removing the other query from consideration;
determining respective match score for each of the other queries not removed from consideration, including adjusting the respective score by the regular-term weight for each regular term of the user-submitted query that appears in the other query, adjusting the respective score by the optional-term weight for each optional term of the user-submitted query that appears in the other query, and adjusting the respective score by the stopword-term weight for each stopword term of the user-submitted query that appears in the other query, wherein all operations of adjusting by a weight are the same operation, and all operations of adjusting either add the weight to the respective match score or multiply the respective match score by the weight; and determining a respective score for each other query not removed from consideration from the match score for the other query;

selecting one or more of the other queries based on each of the respective scores of the other queries;

deriving a quality of result statistic for the document from respective data associated with the selected queries, the respective data being indicative of prior user interaction with the document when the document was provided as a search result for the selected queries; and providing the quality of result statistic as the quality of result statistic input to a document ranking process for the user-submitted query, the document ranking process configured to rank a plurality of documents responsive to the user-submitted query.

13. The computer program product of claim 12 in which one of the respective scores is decreased by a penalty amount when terms in a corresponding one of the other queries are in a different order than the terms in the user-submitted query.

14. The computer program product of claim 12 in which deriving the quality result statistic further comprises weighting the respective data associated each of the selected queries by the respective scores for each of the selected queries and aggregating the weighted respective data.

15. The computer program product of claim 12, wherein, for at least one of the other queries not excluded from consideration, determining a respective score comprises:
calculating a multiplicative match score and an absolute match score for each of the other queries not removed from consideration based on the weights, where the multiplicative match score is determined based on multiplication of the weights and wherein the absolute match score is determined based on addition of the weights;
determining whether to use the absolute match score, the multiplicative match score, or a combination thereof as the respective score for each of the other queries not removed from consideration based on a comparison of lengths of the user-input query and the other query; and
based on the determination of whether to use the absolute match score, the multiplicative match score, or the combination thereof, calculating the respective score for the other queries not removed from consideration using the absolute match score, the multiplicative match score, or the combination thereof.

16. The computer program product of claim 12 where scoring the one or more other queries comprises:
receiving one or more variant terms of the user-submitted query and one or more variants of each of the variant terms; and
receiving, for each variant term and for each variant of the variant term, an associated variant-term weight;
wherein determining a respective score for the other queries not removed from consideration further includes adding to the respective score the variant-term weight for each variant term that appear in the other query.

17. A system for providing input to a document ranking process for ranking a plurality of documents, the system comprising:
one or more servers;
an interface to the one or more servers that is configured to receive an indication of a document identified as a search result of a user-submitted query;
a query scoring engine installed on the one or more servers that is configured to, for the document identified as a search result of the user-submitted query, score one or more other queries based upon a similarity to the user-submitted query, each of the one or more other queries being different from the user-submitted query, where scoring the one or more other queries comprises:
receiving optional terms, regular terms, and stopword terms of the user-submitted query;
receiving an optional-term weight, a regular-term weight; and a stopword-term weight;
receiving terms of the one or more other queries;
determining for each of the other queries whether the other query includes an exact match for each required term in the user-submitted query and, if not, removing the other query from consideration;
determining a respective match score for each of the other queries not removed from consideration, including adjusting the respective score by the regular-term weight for each regular term of the user-submitted query that appears in the other query, adjusting the respective score by the optional-term weight for each optional term of the user-submitted query that appears in the other query, and adjusting the respective score by the stopword-term weight for each stopword term of the user-submitted query that appears in the other query, wherein all operations of adjusting by a weight are the same operation, and all operations of adjusting either add the weight to the respective match score or multiply the respective match score by the weight; and
determining a respective score for each other query not removed from consideration from the match score for the other query;
wherein the query scoring engine is further configured to select one or more of the other queries based on each of the respective scores of the other queries; and
a rank modifier engine installed on the one or more servers that is configured to derive a quality of result statistic for the document from respective data associated with the selected queries, the respective data being indicative of prior user interaction with the document when the document was provided as a search result for the selected queries, wherein the rank modifier engine is further configured to provide the quality of result statistic as the quality of result statistic input to a document ranking process for the user-submitted query, the document ranking process configured to rank a plurality of documents responsive to the user-submitted query.

18. The system of claim 17 in which one of the respective scores is decreased by a penalty amount when terms in a corresponding one of the other queries are in a different order than the terms in the user-submitted query.

19. The system of claim 17, wherein, for at least one of the other queries not excluded from consideration, determining a respective score comprises:
calculating a multiplicative match score and an absolute match score for each of the other queries not removed from consideration based on the weights, where the multiplicative match score is determined based on multiplication of the weights and wherein the absolute match score is determined based on addition of the weights;
determining whether to use the absolute match score, the multiplicative match score, or a combination thereof as the respective score for each of the other queries not removed from consideration based on a comparison of lengths of the user-input query and the other query; and
based on the determination of whether to use the absolute match score, the multiplicative match score, or the combination thereof, calculating the respective score for the other queries not removed from consideration using the absolute match score, the multiplicative match score, or the combination thereof.

20. The system of claim 17 in which where scoring the one or more other queries comprises:

receiving one or more variant terms of the user-submitted query and one or more variants of each of the variant terms; and receiving, for each variant term and for each variant of the variant term, an associated variant-term weight;

wherein determining a respective score for the other queries not removed from consideration further includes adding to the respective score the variant-term weight for each variant term that appear in the other query.

* * * * *